United States Patent
Levin et al.

(10) Patent No.: US 6,644,703 B1
(45) Date of Patent: Nov. 11, 2003

(54) SELF-ADAPTIVE VACUUM GRIPPING SYSTEM

(75) Inventors: Daniel Levin, Haifa (IL); Yuval Yassour, Haifa (IL)

(73) Assignee: Core Flow Ltd., Yokneam (IL)

( * ) Notice: Subject to any disclaimer, the term of this patent is extended or adjusted under 35 U.S.C. 154(b) by 67 days.

(21) Appl. No.: 10/070,263

(22) PCT Filed: Aug. 20, 2000

(86) PCT No.: PCT/IL00/00501

§ 371 (c)(1),
(2), (4) Date: Feb. 25, 2002

(87) PCT Pub. No.: WO01/19572

PCT Pub. Date: Mar. 22, 2001

(30) Foreign Application Priority Data

Aug. 25, 1999 (IL) .................................................. 131591

(51) Int. Cl.[7] .............................. A47J 45/00; B25J 15/00
(52) U.S. Cl. ...................................... 294/64.1; 294/64.3
(58) Field of Search ............................... 294/64.1–64.3, 294/65; 29/743; 137/808–811, 814; 239/461, 499–502, 542, 553.5, 589.1, 590.5; 269/21; 901/40

(56) References Cited

U.S. PATENT DOCUMENTS

| | | | | |
|---|---|---|---|---|
| 3,870,236 A | * | 3/1975 | Sahagun-Barragan | 239/542 |
| 3,896,999 A | * | 7/1975 | Barragan | 239/107 |
| 4,151,955 A | * | 5/1979 | Stouffer | 239/540 |
| 4,209,133 A | * | 6/1980 | Mehoudar | 239/542 |
| 4,413,787 A | * | 11/1983 | Gilead et al. | 239/542 |
| 4,430,020 A | * | 2/1984 | Robbins | 239/542 |
| 4,497,445 A | * | 2/1985 | Adkins et al. | 239/590 |
| 4,573,640 A | * | 3/1986 | Mehoudar | 239/542 |
| 4,718,608 A | * | 1/1988 | Mehoudar | 239/542 |
| 4,880,167 A | * | 11/1989 | Langa et al. | 239/542 |
| 5,207,386 A | * | 5/1993 | Mehoudar | 239/542 |
| 5,516,125 A | * | 5/1996 | McKenna | 294/64.1 |
| 5,620,143 A | * | 4/1997 | Delmer et al. | 239/542 |
| 5,967,577 A | * | 10/1999 | Bhandarkar et al. | 294/64.1 |
| 6,099,056 A | * | 8/2000 | Siniaguine et al. | 294/64.3 |

* cited by examiner

Primary Examiner—Eileen D. Lillis
Assistant Examiner—Paul T. Chin
(74) Attorney, Agent, or Firm—Reed Smith LLP; William H. Dippert

(57) ABSTRACT

A self-adaptive vacuum grip apparatus includes a vacuum source (51), a vacuum reservoir (54) fluidically connected to the vacuum source; a contact surface (56), and a plurality of conduits (55); where a conduit has an inlet (2) positioned on the contact surface and an outlet (3) fluidically connected to the vacuum reservoir. The conduit is provided with a plurality of fins (4, 5) mounted on the internal wall thereof arranged in two arrays substantially opposite each other. Each of the fins of the arrays, excluding the fin nearest to the inlet and the fin nearest to the outlet of the conduit, is positioned substantially opposite one of a plurality of cavities wherein opposing fin arrays are arranged asymmetrically. When fluid flows through the conduit, a plurality of vortices (6, 7) are formed within the cavities which exist at least temporarily during the flow, thus forming an aerodynamic blockage allowing a central core-flow, thus forming an aerodynamic blockage allowing a central core-flow, between the vortices and the tips of the fins suppressing the flow in a one-dimensional manner to limit the mass flow rate and maintain a substantial pressure drop withing the conduit.

47 Claims, 18 Drawing Sheets

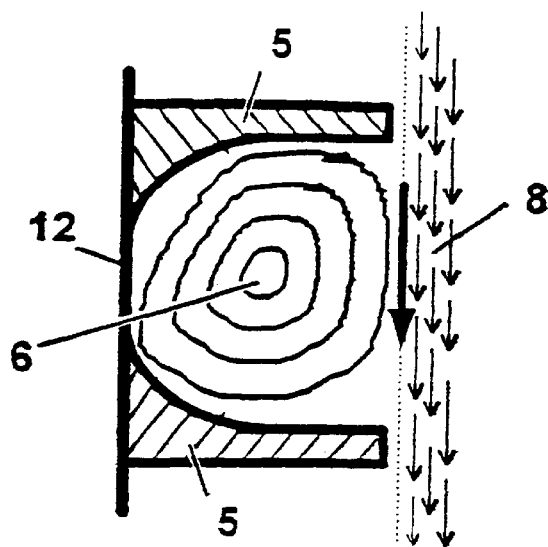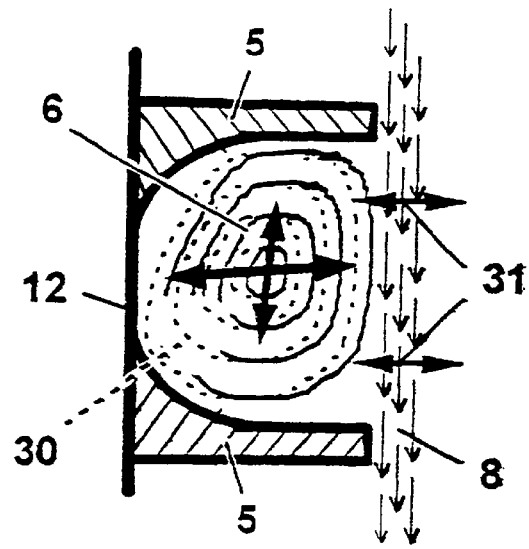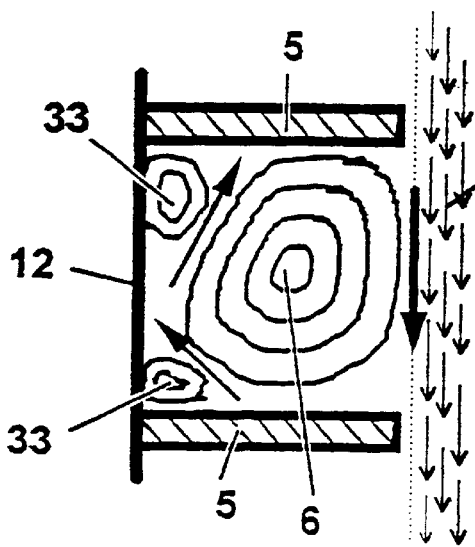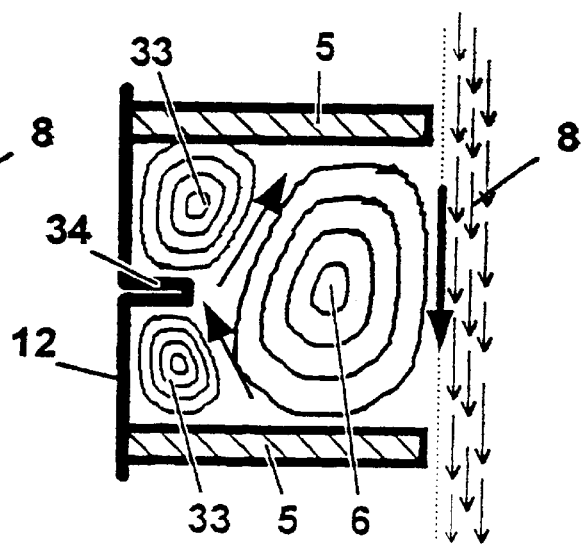

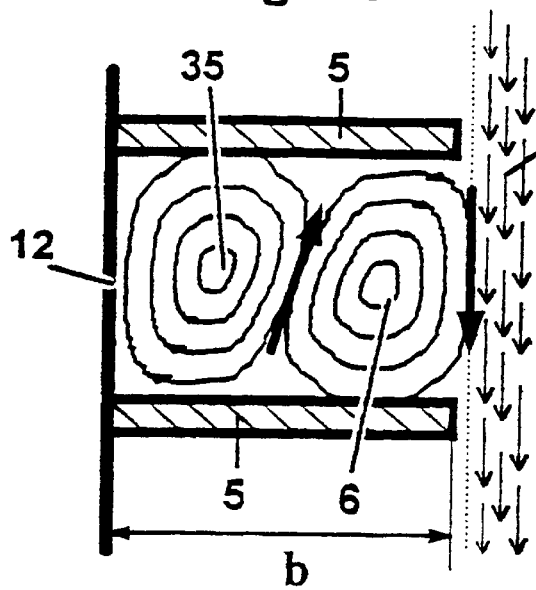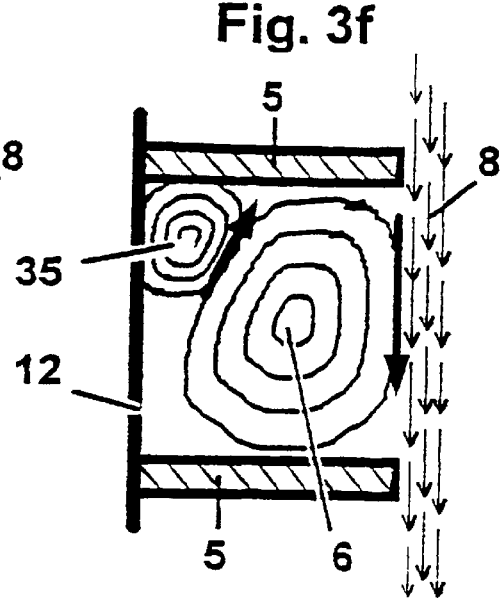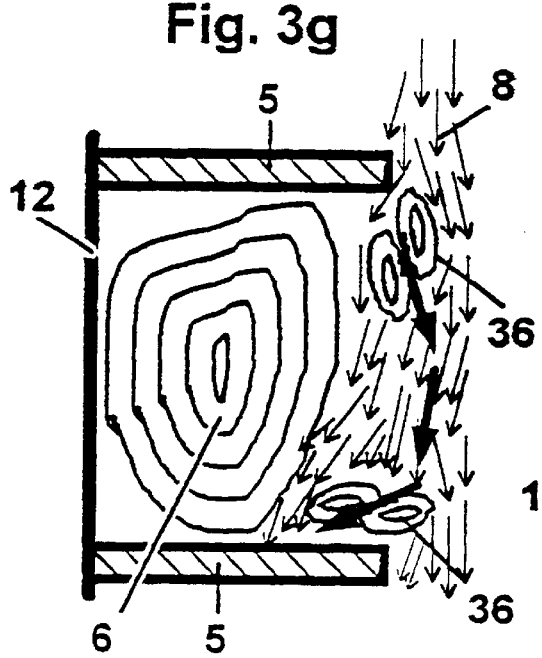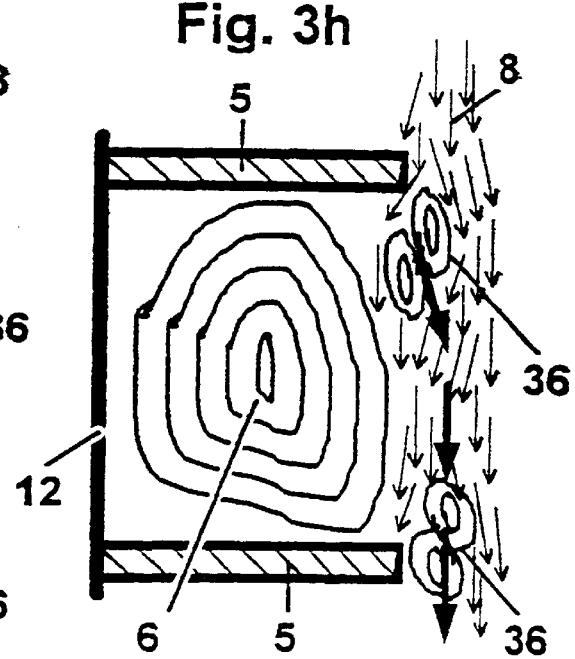

Radial SAGU

Tangential SAGU

Fig. 6a
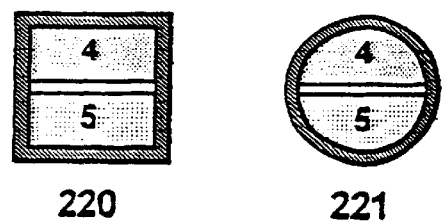
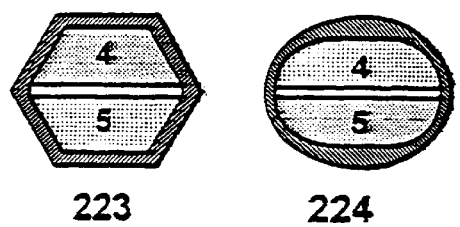
Fig. 6b
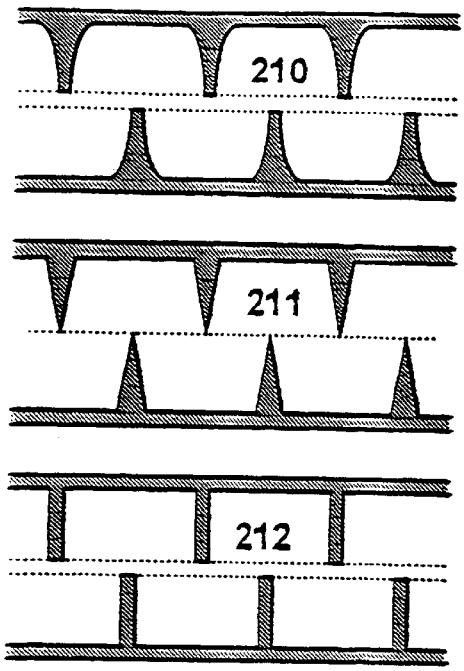
Fig. 6c
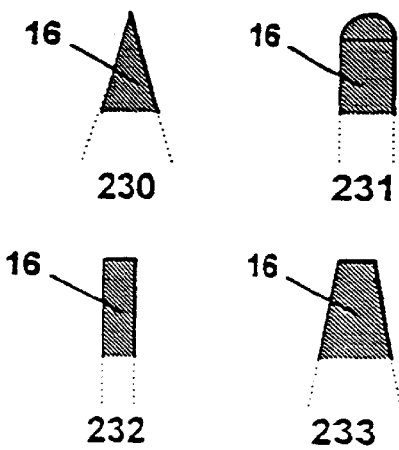
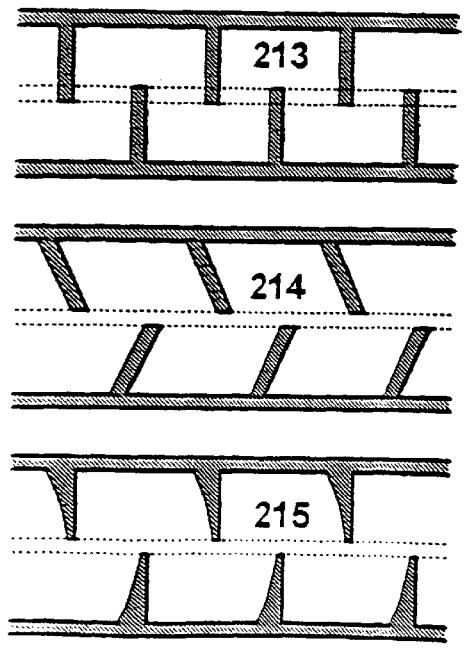

Local Cross-Section

SELF-ADAPTIVE VACUUM GRIPPING SYSTEM

FIELD OF INVENTION

The present invention is related to vacuum support systems. More particularly it relates to a self adaptive vacuum support system, employing aerodynamic forces.

BACKGROUND OF THE INVENTION

Vacuum support systems are widely used in many industrial areas. A vacuum support system may serve either to fix an object in place or to hold an object while it is being conveyed from one location to another. Vacuum support systems are widely in used in the Hi-Tech Industries. Holding a wafer during its fabrication process or during deicing in the Semiconductors (SC) industry, holding a Printed Circuit Board (PCR) or a flat-screen during Automatic Optical Inspection (the AOI industry), or holding an aluminum printing-plate to a rotating drum in the Printing or Art-Graphic industries, make just a short list of examples where vacuum support systems are being utilized.

Vacuum support systems employ the pressure difference between a higher ambient pressure that acts on the object upper surface, and the vacuum imposed on the object lower surface. The pressure difference, multiplied by the effective area, makes up the force that holds the object (hereafter referred to as "vacuum-force"). In Conventional systems, the vacuum-force is linearly dependent on both the pressure difference and the effective area.

Conventional vacuum-support systems comprise a vacuum pump fluidically connected by vacuum-pipes to a plurality of drilled cylindrical holes arranged on the system contact surface. In most cases, the contact surface is flat or a cylinder. In many practical cases such simple solution is not acceptable. A common vacuum support system failure occurs when a plurality of vacuum-conduits (i.e. the holes) are present but a significant number of them are not covered because the object to be held is smaller than the vacuum-frame. Another common problem in such systems may occur, when the object is not fully attached to the contact surface, or when the surface of the object has cavities and/or grooves, allowing air to escape through and failing to obtain a substantial vacuum force. In addition, situations where some of the initially closed vacuum-conduits become exposed during the process (such as the dicing process), are very common in the SC industry.

When all the vacuum-conduits are blocked, the parasite mass flow rate (hereafter referred to as MFR), of the air through the conduits is accountable and acceptable, but when a significant number of vacuum-conduits are opened, the parasite MFR severely increases, the vacuum level may critically degrade, and the vacuum-force may be lost. Many improvised solutions had been suggested to reduce the occurrence of parasite MFR: covering the exposed vacuum-conduits before operation, or activating only sectors of the vacuum-frame to introduce the vacuum only to the "active" section of the vacuum-frame, are some of such solutions. However these are only partial semi-effective solutions.

The problem of parasite MFR must be solved in order to achieve reliable vacuum support system. One common way, is to use a powerful vacuum pump to provide the required vacuum level to account for the presence of parasite MFR. Such a solution is expensive (the cost of powerful pump and auxiliary equipment and the wasted energy when the system operates), and occupies unnecessary volume and weight. It may also be a powerful source for significant noise and mechanical vibrations. In particular, the use of a simple vacuum-conduit may result in an unacceptable noise. Simple vacuum-conduits can not sustain internal pressure drops, and, therefore, when the vacuum-conduits are open and subjected to external pressure gap, the mechanism of external pressure relaxation (at the vacuum-conduits exit), may involve noisy jets. In cases where the external pressure gap is sufficiently large, super-sonic (extremely noisy) jets may develop. In such noisy situations the use of vacuum support systems may be questionable, when "quiet room" conditions are required.

Other solutions exist where small diameter vacuum-conduits are used, ending with enlarged effective area, thus MFR is reduced and the required vacuum-force is obtained. Such brute-force solutions severely increase the risk of mechanical blockage by contaminants, being particles or liquid. However, such mechanical blockage results in a loss of the vacuum-force, and it may dramatically increase maintenance expenses. In addition, small diameter vacuum-conduits are characterized by poor time response, including the response to control commands.

Solutions to control the MFR based on using an individual valve-like control device for each of the vacuum-conduit, are not practical, especially when a large number of vacuum-conduits are used. Valves are more expensive, and may involve mechanical or electromechanical means, thus the maintenance task becomes unfeasible. Controlling the parasite MFR must be solved in a favorable way, to meet the practical requirements for a well-functioning vacuum support system.

The Self Adaptive Vacuum Support Apparatus disclosed in the present Invention is based on the SASO concept, as described in detail in our Israeli Patent Application titled SELF ADAPTIVE SEGMENTED ORIFICE (SASO) DEVICE AND METHOD, simultaneously filed with the present application.

The only related prior art references having some relevance to the present invention deal with irrigation emitters only where the fluid passing through it is water which is practically incompressible (as opposed to air or other gases).

U.S. Pat. No. 3,896,999 (Barragan) disclosed an anti-clogging drip irrigation valve, comprising a wide conduit equipped with a plurality of partition means, integrally formed with the conduit wall, forming labyrinth conduits, in order to reduce the water pressure prior to its exit through the labyrinth conduits outlet.

U.S. Pat. No. 4,573,640 (Mehoudar) disclosed an irrigation emitter unit providing a labyrinth conduit similarly to the valve in U.S. Pat. No. 3,896,999. Examples of other devices providing labyrinth conduits for the purpose of providing a pressure drop along the conduit can be found in U.S. Pat. No. 4,060,200 (Mehoudar), U.S. Pat. No. 4,413,787 (Gilead et al.). U.S. Pat. No. 3,870,236 (Sahagun-Barragan), U.S. Pat. No. 4,880,167 (Langa), U.S. Pat. No. 5,620,143 (Delmer et al.), U.S. Pat. No. 4,430,020 (Robbins), U.S. Pat. No. 4,209,133 (Mehoudar), U.S. Pat. No. 4,718,608 (Mehoudar), U.S. Pat. No. 5,207,386 (Mehoudar).

In a labyrinth conduit the aerodynamic resistance is substantially large due to the viscous friction exerted by the walls of the conduit (acting opposite to the direction of the flow), and as the passage becomes tortuous and lengthier (that's the essential feature of a labyrinth) more wall contact surface is acting on the flow, increasing the viscous friction. In some cases cavities are provided for intercepting contaminants and for freeing the flow passage. None of these patents, which basically deal with two dimensional geometry (the third being either very small or degenerated), mention or make use of a vortical aerodynamic blockage mechanism, that is an essential feature of the present invention.

It is emphasized that while the above mentioned patents deal with the delivery of water through the conduit, the present invention seeks to provide and exploit aerodynamically induced vacuum grip force, with the fluid—air in most cases—merely serving as the means for generating this force, and on the other hand reducing the parasite mass flow rate through the conduit when the vacuum grip at the conduit's inlet is lost.

In an article titled "A FLOW VISUALIZATION STUDY OF THE FLOW IN A 2D ARRAY OF FINS" (S. Brokman, D Levin, Experiments in Fluids 14, 241–245 (1993)) a study of the flow field in a 2D arrangement of fins was carried out by means of flow visualization in a vertical flow tunnel. The study was related to an earlier studies that examined the fin arrangement as a conceptual heat sink. The above mentioned study went further to examine the complex flow field structure in order to obtain a better understanding of the heat convection process. A model was built of several series of fins, simulating a spatially unlimited multi-cell structure. Two main flow structures were observed—a flow separation from the leading edge of each fin, which due to the influence of neighboring fins, was reattached to the fin, creating a closed separation zone, and a vortex, that filled that closed separation zone.

BRIEF DESCRIPTION OF THE INVENTION

It is therefore provided, in accordance with a preferred embodiment of the present invention, a self-adaptive vacuum grip apparatus comprising: a vacuum source; a vacuum reservoir fluidically connected to said vacuum source; a contact surface; at least one conduit of a plurality of conduits; wherein said conduit has an inlet positioned on said contact surface and an outlet fluidically connected to said vacuum reservoir said conduit is provided with a plurality of fins mounted on the internal wall of said conduit said fins arranged in two arrays substantially opposite each other; wherein each of the fins of either one of said fin arrays excluding the fin nearest to the inlet and the fin nearest to the outlet of said conduit is positioned substantially opposite one of a plurality of cavities each cavity defined between two consecutive fins of one of said arrays of fins and a portion of said conduit internal walls wherein said two opposing fin arrays are arranged asymmetrically; whereby when fluid flows through said conduit a plurality of vortices formed within said cavities said vortices existing at least temporarily during said flow thus forming an aerodynamic blockage allowing a central core-flow between said vortices and the tips of said fins suppressing the flow in a one-dimensional manner thus limiting the mass flow rate and maintaining a substantial pressure drop within the conduit; and whereby when an object blocks the inlet of said conduit the flow stops said vortices dissipate thus said object is effectively held by the vacuum induced force to said contact surface whereas when the inlet is not blocked said vortices are formed and aerodynamically block the flow through said conduit and when said conduit inlet is not blocked by said object the required vacuum level of said vacuum reservoir is maintained with significantly reduced power consumption supplied to generate the required vacuum condition.

Furthermore, in accordance with a preferred embodiment of the present invention, said fluid is air.

Furthermore, in accordance with a preferred embodiment of the present invention, said fins are L-shaped where the thin core-flow is suppressed in a two-dimensional manner by said vortices.

Furthermore, in accordance with a preferred embodiment of the present invention, said fins are U-shaped where the thin core-flow is suppressed in a two-dimensional manner by said vortices.

Furthermore, in accordance with a preferred embodiment of the present invention, conduit follows a straight path.

Furthermore, in accordance with a preferred embodiment of the present invention, said conduit follows a tortuous path.

Furthermore, in accordance with a preferred embodiment of the present invention, said conduit cross-section is substantially rectangular.

Furthermore, in accordance with a preferred embodiment of the present invention, said conduit cross-section is substantially polygonal.

Furthermore, in accordance with a preferred embodiment of the present invention, said conduit cross-section is substantially circular.

Furthermore, in accordance with a preferred embodiment of the present invention, the downstream distribution of said conduit cross-section area is uniform.

Furthermore, in accordance with a preferred embodiment of the present invention, the downstream distribution of said conduit cross-section area is divergent.

Furthermore, in accordance with a preferred embodiment of the present invention, the downstream distribution of said conduit cross-section area is convergent.

Furthermore, in accordance with a preferred embodiment of the present invention, said fins are substantially perpendicular to said internal wall of the conduit.

Furthermore, in accordance with a preferred embodiment of the present invention, said fins are inclined with respect both to the general core-flow direction of motion and to the conduit internal walls.

Furthermore, in accordance with a preferred embodiment of the present invention, said fin typical thickness is of smaller order with comparison to the distance between two consecutive fins of same said fin array.

Furthermore, in accordance with a preferred embodiment of the present invention, said fin cross-section is substantially rectangular.

Furthermore, in accordance with a preferred embodiment of the present invention, said fin cross-section is substantially trapezoidal.

Furthermore, in accordance with a preferred embodiment of the present invention, said fin cross-section is substantially concave at least on one side.

Furthermore, in accordance with a preferred embodiment of the present invention, the distance between two consecutive fins is constant along the conduit.

Furthermore, in accordance with a preferred embodiment of the present invention, the distance between two consecutive fins varies along the conduit.

Furthermore, in accordance with a preferred embodiment of the present invention, the span of each of said fins is uniform along the conduit.

Furthermore, in accordance with a preferred embodiment of the present invention, the span of said fins varies along the conduit.

Furthermore, in accordance with a preferred embodiment of the present invention, the span of said fin is laterally uniform.

Furthermore, in accordance with a preferred embodiment of the present invention, the span of said fin laterally varies.

Furthermore, in accordance with a preferred embodiment of the present invention, the tips of said fins are sharp.

Furthermore, in accordance with a preferred embodiment of the present invention, the tips of said fins are blunt.

Furthermore, in accordance with a preferred embodiment of the present invention, the tips of said fins are curved.

Furthermore, in accordance with a preferred embodiment of the present invention, each of said fins substantially blocks half of the conduit lateral width.

Furthermore, in accordance with a preferred embodiment of the present invention, the two opposite fin arrays do not overlap.

Furthermore, in accordance with a preferred embodiment of the present invention, the two opposite fin arrays overlap.

Furthermore, in accordance with a preferred embodiment of the present invention, the ratio between the fin span and the gap between that fin and a consecutive fin of the same array of fins is in the range of 1:1 to 1:2.

Furthermore, in accordance with a preferred embodiment of the present invention, the ratio is about 1:1.5.

Furthermore, in accordance with a preferred embodiment of the present invention, the absolute value of the gap between the virtual plane connecting the fin tips of one of said two opposite fin arrays and the virtual plane connecting the fin tips of the second of said two opposite fin arrays is of smaller order than the lateral width of said conduit.

Furthermore, in accordance with a preferred embodiment of the present invention, said absolute value of said gap is not more than 20% of the adjacent lateral width of said conduit.

Furthermore, in accordance with a preferred embodiment of the present invention, the size of each of said cavities is slightly smaller than the integrally defined natural scales associated with the vorticity of the vortex formed inside said cavity.

Furthermore, in accordance with a preferred embodiment of the present invention, is said conduit passive dimension defined as the dimension substantially parallel to said vortices virtual axes and substantially perpendicular to said core-flow motion is in the order of the fins span.

Furthermore, in accordance with a preferred embodiment of the present invention, said passive dimension is substantially larger than the other lateral dimension of the conduit that is substantially perpendicular to both the vortex axis and to the core-flow motion.

Furthermore, in accordance with a preferred embodiment of the present invention, said passive dimension follows a close substantially annular route.

Furthermore, in accordance with a preferred embodiment of the present invention, when Reynolds Number is increased inside said conduit further secondary vortices are formed.

Furthermore, in accordance with a preferred embodiment of the present invention, said core-flow downstream motion is substantially sinusoidal.

Furthermore, in accordance with a preferred embodiment of the present invention, the sinusoidal core-flow strongly interacts with the fins by local impingement of the core flow with the surfaces of the fins facing its motion.

Furthermore, in accordance with a preferred embodiment of the present invention when Reynolds Number is increased inside said conduit said core-flow breaks down locally and frequently generates unsteady secondary vortices intensively interacting with the core-flow or impinging on the surface of the facing fin.

Furthermore, in accordance with a preferred embodiment of the present invention, the vacuum within said vacuum reservoir is produced by a vacuum-pump.

Furthermore, in accordance with a preferred embodiment of the present invention, said vacuum reservoir is a vacuum-manifold.

Furthermore, in accordance with a preferred embodiment of the present invention, said conduits are provided with an automated valve.

Furthermore, in accordance with a preferred embodiment of the present invention, the device is further provided with control and sensing means to serve the control task by actuating said valve by controlling the vacuum level or makes use of any other means of control.

Furthermore, in accordance with a preferred embodiment of the present invention, said conduits are substantially parallel to said contact surface.

Furthermore, in accordance with a preferred embodiment of the present invention, said conduits are conduits mount normally to said contact surface.

Furthermore, in accordance with a preferred embodiment of the present invention, said contact surface is a flat vacuum frame.

Furthermore, in accordance with a preferred embodiment of the present invention, said vacuum frame is rectangular.

Furthermore, in accordance with a preferred embodiment of the present invention, said vacuum frame is circular.

Furthermore, in accordance with a preferred embodiment of the present invention, said contact surface is cylindrical to present a drum-like contact surface.

Furthermore, in accordance with a preferred embodiment of the present invention, said contact surface includes grooves.

Furthermore, in accordance with a preferred embodiment of the present invention, the device used to convey an object with contact to said contact surface.

Furthermore, in accordance with a preferred embodiment of the present invention, it operates with respect to gravity.

Furthermore, in accordance with a preferred embodiment of the present invention, it operates irrespectful of the direction of gravity.

Furthermore, in accordance with a preferred embodiment of the present invention, it is provided a self-adaptive vacuum grip apparatus comprising: a vacuum source; a vacuum reservoir fluidically connected to said vacuum source; a contact surface; at least one conduit of a plurality of conduits; wherein said conduit has an inlet positioned on said contact surface and an outlet fluidically connected to said vacuum reservoir said conduit is provided with a helical fin mounted on the internal wall of said conduit thus a helical cavity is formed defined by said helical fin and said internal wall; wherein when a fluid flows through said conduit a helical vortex is formed within said helical cavity said helical vortex exists at least temporarily during said flow thus forming an aerodynamic blockage allowing a central core-flow between the vortex and the tip of said helical fin and suppressing the flow in a two-dimensional manner, thus limiting the mass flow rate and maintaining a substantial pressure drop within the conduit; whereby said core flow flows through a central passage defined by the helical fin internal edge and may locally bypass an obstruction in said central passage by following the helical passage adjacent the helical fin; and whereby when an object blocks the inlet of said conduit the flow stops said helical vortex dissipate thus said object is effectively held by the vacuum induced force to said contact surface whereas when the inlet is not blocked said vortices are formed and aerodynamically blocking the flow through said conduit and when said conduit is not blocked by said object the required vacuum level of said vacuum reservoir is maintained with significantly reduced power consumption supplied to generate the required vacuum condition.

Furthermore, in accordance with a preferred embodiment of the present invention, said fluid is air.

Furthermore, in accordance with a preferred embodiment of the present invention, at least one barrier of a plurality of barriers is mounted substantially normally to said helical fin surface thus locally blocking the helical path to prevent the flow from following the helical path and thus said helical vortex locally splits by said barriers to at least two fragments.

Furthermore, in accordance with a preferred embodiment of the present invention, at least one barrier out of two barriers is mounted substantially normally to the fin surface on one of the two ends of said helical fin to act as anchorage for said helical vortex.

Furthermore, in accordance with a preferred embodiment of the present invention, said conduit follows a straight path.

Furthermore, in accordance with a preferred embodiment of the present invention, said conduit follows a tortuous path.

Furthermore, in accordance with a preferred embodiment of the present invention, said conduit cross-section is substantially circular.

Furthermore, in accordance with a preferred embodiment of the present invention, said conduit cross-section is substantially rectangular.

Furthermore, in accordance with a preferred embodiment of the present invention, said conduit cross-section is substantially polygonal.

Furthermore, in accordance with a preferred embodiment of the present invention, the downstream distribution of said conduit cross-section area is uniform.

Furthermore, in accordance with a preferred embodiment of the present invention, the downstream distribution of said conduit cross-section area is divergent.

Furthermore, in accordance with a preferred embodiment of the present invention, the downstream distribution of said conduit cross-section area is convergent.

Furthermore, in accordance with a preferred embodiment of the present invention, said helical fin is substantially perpendicular to said internal wall of the conduit.

Furthermore, in accordance with a preferred embodiment of the present invention, said helical fin is inclined with respect both to the general core-flow direction of motion and the to conduit wall.

Furthermore, in accordance with a preferred embodiment of the present invention, said helical fin thickness is of smaller order with comparison to said helical fin pitch.

Furthermore, in accordance with a preferred embodiment of the present invention, said helical fin cross-section is substantially rectangular.

Furthermore, in accordance with a preferred embodiment of the present invention, said helical fin cross-section is substantially trapezoidal.

Furthermore, in accordance with a preferred embodiment of the present invention, said helical fin cross-section is substantially concave at least at one side having a fin root larger than the fin tip.

Furthermore, in accordance with a preferred embodiment of the present invention, the helical fin pitch is constant along the conduit.

Furthermore, in accordance with a preferred embodiment of the present invention, said helical fin pitch varies along the conduit.

Furthermore, in accordance with a preferred embodiment of the present invention, the span of said helical fin is uniform.

Furthermore, in accordance with a preferred embodiment of the present invention, the span of said helical fin varies along the conduit.

Furthermore, in accordance with a preferred embodiment of the present invention, the tip of said helical fin is sharp.

Furthermore, in accordance with a preferred embodiment of the present invention, the tip of said helical fin is blunt.

Furthermore, in accordance with a preferred embodiment of the present invention, the tip of said helical fin is curved.

Furthermore, in accordance with a preferred embodiment of the present invention, said helical fin span is substantially half of the conduit lateral width.

Furthermore, in accordance with a preferred embodiment of the present invention, the ratio between the helical fin span and the helical fin pitch is in the range of 1:1 to 1:2.

Furthermore, in accordance with a preferred embodiment of the present invention, the ratio is about 1:1.5.

Furthermore, in accordance with a preferred embodiment of the present invention, the central passage defined by the helical fin tip is of smaller order in comparison with the hydraulic diameter of said conduit.

Furthermore, in accordance with a preferred embodiment of the present invention, said passage is not more than 30% of the adjacent lateral width of said conduit.

Furthermore, in accordance with a preferred embodiment of the present invention, the size of said helical cavity is slightly smaller than the integrally defined natural lateral scales associated with the vorticity of the helical vortex.

Furthermore, in accordance with a preferred embodiment of the present invention, when Reynolds Number is increased inside said conduit further secondary vortices are formed.

Furthermore, in accordance with a preferred embodiment of the present invention, the core-flow strongly interacts with said helical fin by local impingement with the surface of the helical fin facing its motion.

Furthermore, in accordance with a preferred embodiment of the present invention, when Reynolds Number is increased inside said conduit said core-flow breaks down locally and frequently generates unsteady secondary vortices, intensively interacting with the core-flow or impinging on the facing fin.

Furthermore, in accordance with a preferred embodiment of the present invention, the vacuum within said vacuum reservoir is produced by a vacuum-pump.

Furthermore, in accordance with a preferred embodiment of the present invention, said vacuum reservoir is a vacuum-manifold.

Furthermore, in accordance with a preferred embodiment of the present invention, said conduits are provided with an automated valve.

Furthermore, in accordance with a preferred embodiment of the present invention, said device is further provided with control and sensing means to serve the control task by actuating said valve and controlling the vacuum level or makes use of any other means of control.

Furthermore, in accordance with a preferred embodiment of the present invention, said conduits are fluidically connected to said contact surface wherein said conduits are parallel to said contact surface.

Furthermore, in accordance with a preferred embodiment of the present invention, said conduits are fluidically connected to said contact surface wherein said conduits mount normally to said contact surface.

Furthermore, in accordance with a preferred embodiment of the present invention, said contact surface is a flat vacuum frame.

Furthermore, in accordance with a preferred embodiment of the present invention, said vacuum frame is rectangular.

Furthermore, in accordance with a preferred embodiment of the present invention, said vacuum frame is circular.

Furthermore, in accordance with a preferred embodiment of the present invention, said contact surface is cylindrical to present a drum-like contact surface.

Furthermore, in accordance with a preferred embodiment of the present invention, said contact surface includes grooves.

Furthermore, in accordance with a preferred embodiment of the present invention, said device is used to convey an object with contact to said contact surface.

Furthermore, in accordance with a preferred embodiment of the present invention, it operates in the direction of gravity.

Finally, in accordance with a preferred embodiment of the present invention, it operates irrespectful of the direction of gravity.

BRIEF DESCRIPTION OF THE FIGURES

In order to better understand the present invention, and appreciate its practical applications, the following FIGURES are provided and referenced hereafter. It should be noted that the FIGURES are given as examples only and in no way limit the scope of the invention as defined in the appending Claims. Like components are denoted by like reference numerals.

FIGS. 3a–h illustrate some possible interactions between various vortical flow patterns with the SASO-cell walls and with the core-flow.

FIG. 6 illustrates geometrical aspects of the fins structure and of fins arrangement of a SASO-device in accordance with a preferred embodiment of the present invention.

DETAILED DESCRIPTION OF THE INVENTION

Figure 1A:
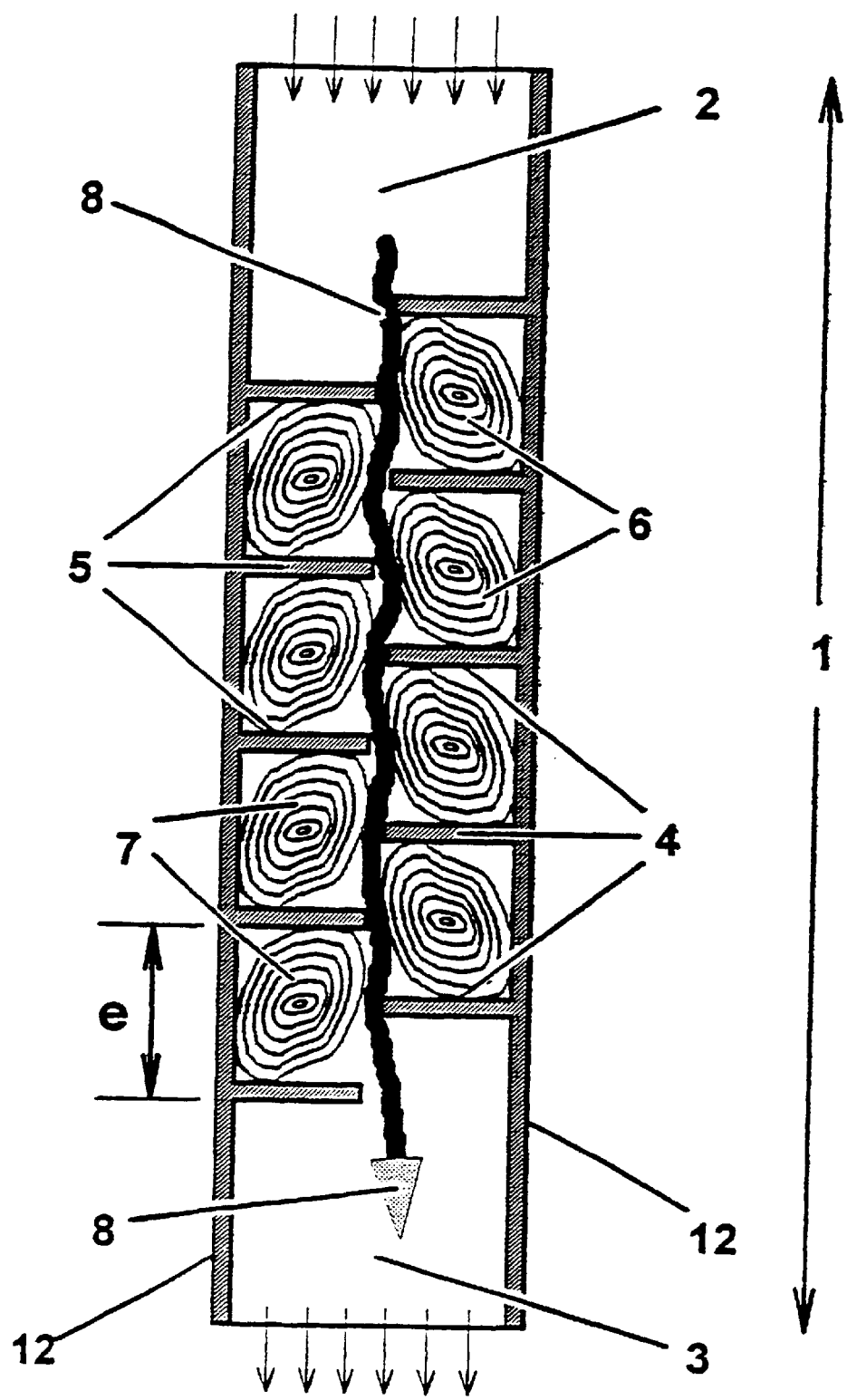
FIG. 1a illustrates a longitudinal cross section view of a Self Adaptive Segmented Orifice Device, in accordance with a preferred embodiment of the present invention, with existing through-flow and formed vortices.

The aerodynamic blockage mechanism is the most important substance of the present invention. It is the essence of SASO-technology that provide a novel vacuum support system of improved characteristics. Hereby SASO Invention is explained with reference to the FIGURES. The SASO-device basic two dimensional configuration in accordance with a preferred embodiment of the present invention comprises a conduit (1), provided with an inlet (2), and outlet (3), having a plurality of fins arranged in two arrays (4, 5), substantially at opposing sides on the inside of the conduit walls (12), as illustrated in FIG.-1a. The two fin arrays are arranged in a relative shifted position, where opposite to the gap formed between two successive fins of the first array of fins (apart from both end fins), there exists one opposite fin of the second array, thus creating the typical asymmetric configuration that characterizes SASO-devices. Consequently, two asymmetrical arrays of cells are formed, each cell bounded by two consecutive fins of the same array, and a portion of the conduit wall in between them. Thus a cavity is defined, where a large vortex may develop inside it when a fluid flows through the conduit (this cavity, hereafter referred to as SASO-cell).

The SASO-device internal configuration dictates the unique vortical flow field pattern established inside the conduit, when a fluid flows through it. Each one of the fins imposes a separation of the flow downstream from the fin's tip. Further downstream, a large fluid structure, a vortex, is generated inside each of the SASO-cells. A vortex is a circular motion of fluid around a virtual axis, where the term "circulation" defines the vortex intensity. A vortex is generated by a well-known rollup mechanism of the separated shear flows, following the flow separation from the upstream fin of each SASO-cell. Beside the main dominant vortices, secondary vortices may develop, playing an important role in the enhancement of SASO-device performance. An optional prominent feature is the unsteady nature of the main vortices, as well as unsteady modes of the secondary vortical flow patterns, that may significantly augment the aerodynamic blockage effect, to be used for the novel the SASO-based vacuum support system.

In practice, a flow pattern of two opposite rows of vortices (6,7), is developed, and is asymmetrically arranged, as shown in FIG.-1a. Each vortex is located inside a SASO-cell, facing an opposite fin. These vortices, and in particular when formed with almost closed stream lines, practically block the flow through the conduit, thus preventing the development of a wide sinusoidal fluid motion, a type of fluid motion that characterizes labyrinth-like conduits. Consequently, a significantly thin core-flow (8), is developed between the blocking fins and the vortices. The core-flow may be of a relatively high downstream velocity, and it is bounded on two sides by the vortices and do not touch the conduit walls. Hence, as the core-flow instability increases, it breaks down and may frequently generate unsteady secondary vortices, shed downstream and intensively interacting with the core-flow. An impingement of the core-flow with the facing fins may also occur, following the core-flow breakdown. In addition, wavy flow patterns of periodic or chaotic nature may develop. Such interactions may significantly enhance the aerodynamic blockage effects. FIG.-1a, which shows schematically a two dimensional longitudinal cross-section through a typical SASO-device conduit, presents a basic SASO-device, with a fully developed vortical flow pattern and vortices present. A SASO-device is a three-dimensional conduit, but can in practice be of essentially two-dimensional nature where the third direction perpendicular to both the core-flow motion and the main vortices virtual axes (hereafter referred to as the "passive direction"). Hence, the illustration of the SASO-device given in FIG.-1a should be considered as the cross-section of a practical device.

When flow exists through the conduit, the two set of vortices block the flow, allowing thus only a very narrow core-flow 8 to develop between the arrays of the vortices and the fins tips. Since the MFR through a SASO-device is mainly conveyed by the core-flow, such a blockage dramatically reduces the MFR. Moreover, additional MFR reduction may be obtained when non-steady interactions between the core-flow and secondary shed vortices occurs inside the SASO-device conduit. The vortical aerodynamic blockage substantially increases the internal pressure drop (hereafter referred to as $\Delta P$), along the conduit. It results from the interaction between the vortices and the SASO-cell walls.

The substantially reduced MFR and the drastic increase in $\Delta P$, are fundamental features of great practical importance in SASO-technology. It should be noted, however, that these important features are obtained only when flow through the conduit exists, where if there is no flow, no vortices are developed. This "dynamic" nature is the essence of the SASO-idea that may be defined as follows:

The special configuration of a SASO-device conduit intentionally dictates the development of the vortical flow patterns.

The vortical flow pattern, by implementing aerodynamic blockage mechanism, is responsible for blocking the flow in a self-adaptive manner, thus reducing the MFR and increasing the $\Delta P$.

It is effective only during the dynamic state, when there is flow through the conduit.

Unsteady cases where the vortical flow patterns are effective only for an essential portion of time, out of the entire operational duration, are also included within the scope of the present invention.

It has to be emphasized that there is a wide variety of possible SASO-device configurations (some of them will be discussed later). Therefore, as long as any device or product essentially implements the vortical aerodynamic blockage mechanism, as dictated by the special internal geometry of the SASO-conduit, it is inherently a SASO-device, and covered by the scope of the present invention. It is true regardless of the specific geometry of the SASO-device.

SASO-device is generally a solid body without any moving parts. It does not involve a need for any mechanical parts (such as springs, membranes etc.), or employ Electromechanical control means. It can be made of metallic material as well as nonmetallic material, such as plastics. Nevertheless, its self-adaptive behavior with respect to external conditions yields a new type of device, where the regulation of the MFR and $\Delta P$ is achieved by applying the aerodynamic blockage mechanism to be used for the novel vacuum support system of the present invention.

The aerodynamic blockage mechanism is the basic self-adaptive nature of the SASO-device. However, additional aspects of self-adaptive nature are associated with it. Apart from the primary vortices that develop within the SASO-cells, additional vortical flow mechanisms of self-adaptive nature might alternatively or simultaneously be developed at different imposed external conditions, or in response to varying external conditions. When increasing the external pressure drop or when the Reynolds number is intentionally increased, the following vortical flow patterns that modify the aerodynamic blockage mechanism may be involved:

The intensity (circulation) of the primary vortices may intensify.

The downstream distribution of the vortices intensity may vary.

The number of effective vortices inside a conduit may change.

Vortex fluttering modes, mostly of periodic nature may be excited.

Secondary shed vortices strongly interacting with the core-flow or with the facing fins may develop.

Such patterns significantly increase the overall aerodynamic blockage efficiency.

As a consequence of the vortical aerodynamic blockage effects, the SASO-device has a unique response during transient operational periods like starting or stopping sequences, or when external conditions such as the pressure drop between the inlet and the outlet are altered. SASO-device response to such transient conditions can be designed to achieve favorable transient behavior such as fast or slow response, smooth response, etc, according to specific requirements of the SASO-based vacuum support system.

Figure 1B:
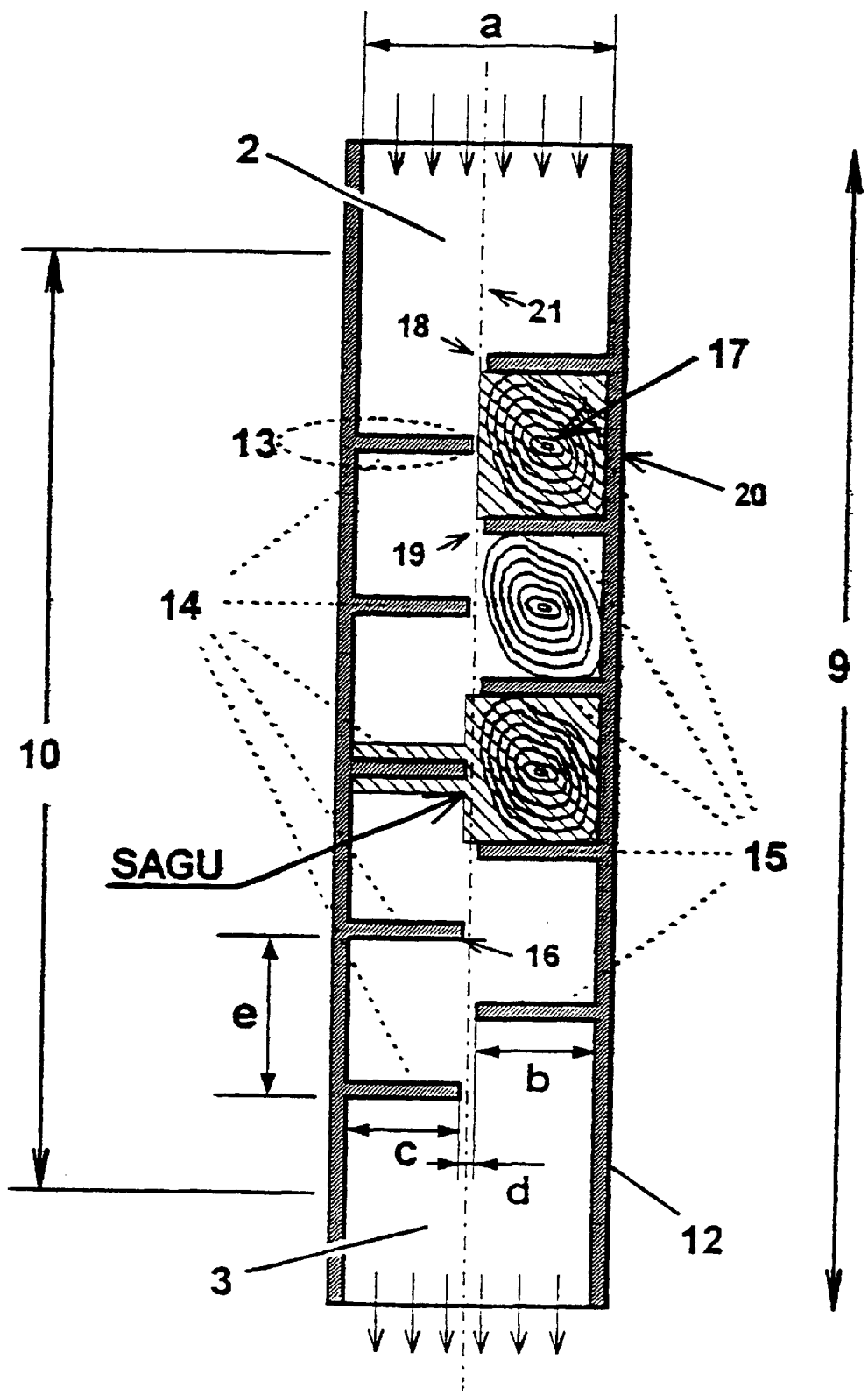
FIG. 1b illustrates a longitudinal cross section view of a Self Adaptive Segmented Orifice Device, in accordance with a preferred embodiment of the present invention, highlighting some of its features for explanatory purposes.
Figure 2A:
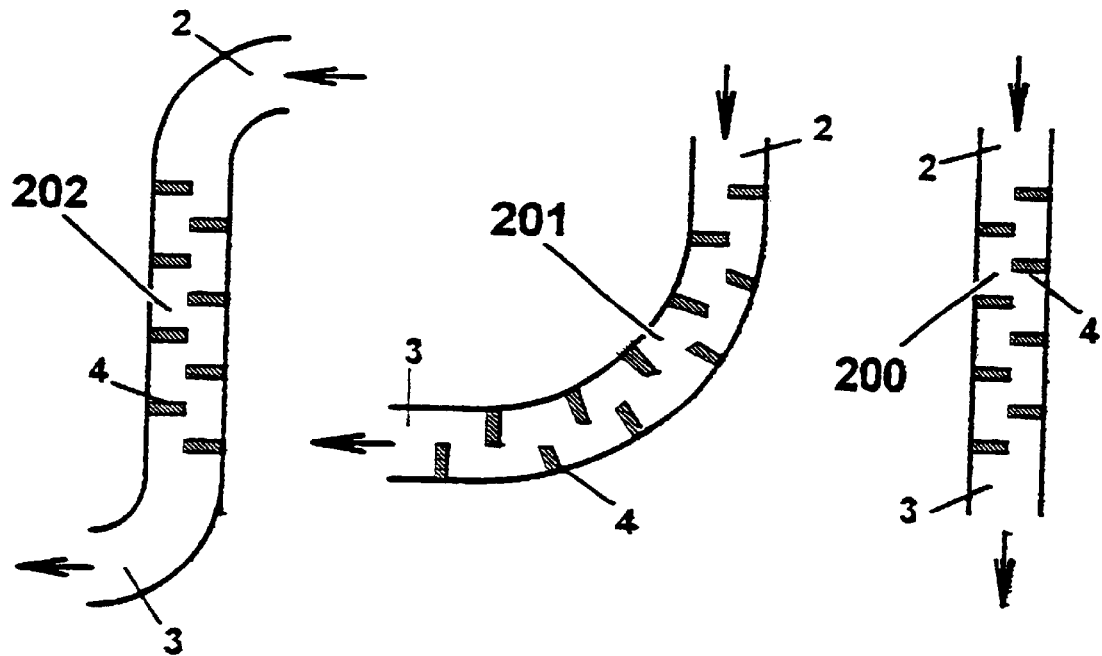
FIG. 2 illustrates some optional configurations of SASO-device conduits in accordance with a preferred embodiment of the present invention.
Figure 2B:
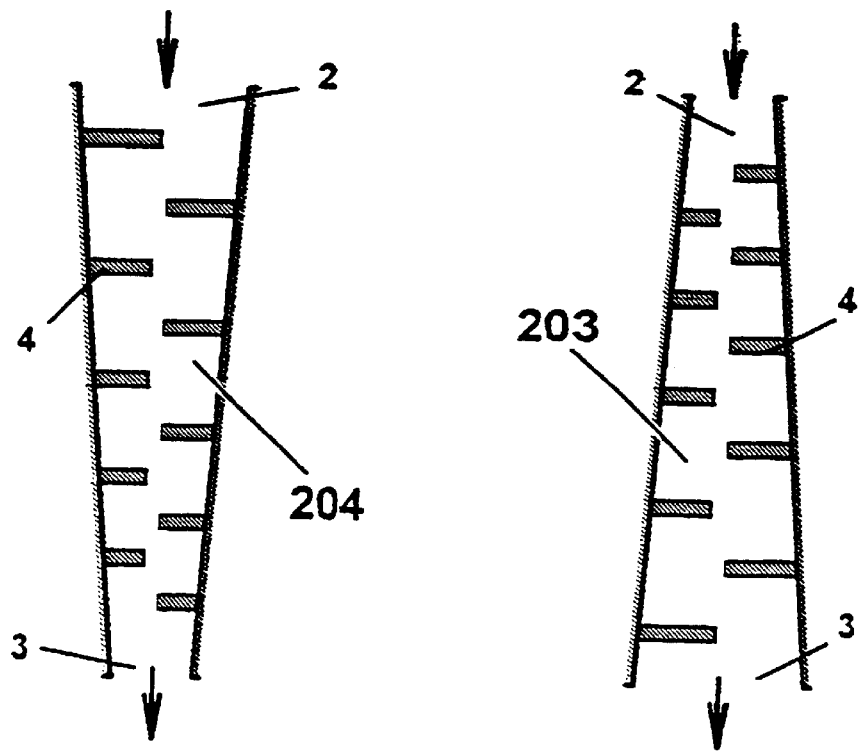

FIG.-1b demonstrates the geometrical aspects of the present invention. The following detailed description of the various SASO-device structural elements, is given with the essential functioning of each of the elements as well as its influence on SASO-device characteristics and the way it affects the vortical flow patterns that block the flow. The first element is the SASO-device conduit (9), which connects between two "reservoirs" of different pressure, one located adjacent to the, inlet (2), and the other located adjacent to the outlet (3) of the conduit. The SASO-device conduit may be stretched in a straight line (FIG.-2a, 200), or aligned along a tortuous course (FIG.-2a, 201,202). FIG.-2a illustrate only 2-dimensional aspect are shown SASO-device conduits course can also be tortuous in a three-dimensional manner, thus the fluid may be conveyed to any desirable direction, distance and location. The downstream distribution of the conduit's cross-section area may be uniform (FIG.-2a, 200), divergent (FIG.-2b, 203), convergent (FIG.-2b, 204), or of any other practical distribution. The conduit cross-section might be of rectangular (FIG.-6a, 220,222), substantially circular (FIG.-6a, 221,224), Polygon (FIG.-6a, 223), or of any other shape dictated by the specific vacuum support task.

The lateral dimension of the SASO-device conduit is denoted by "a" (see FIG.-1b). The internal wall surface of the SASO-device conduit may be smooth or rough to enhance small scale turbulence within the thin boundary layers, attached to the conduit walls. In the case of rough walls, the skin friction is augmented. For the same matter, the conduit Internal wall may also be provided with small extruding obstacles, preferably not greater than the boundary layer width, to enhance local flow separation that triggers wall turbulence.

Figure 5A:
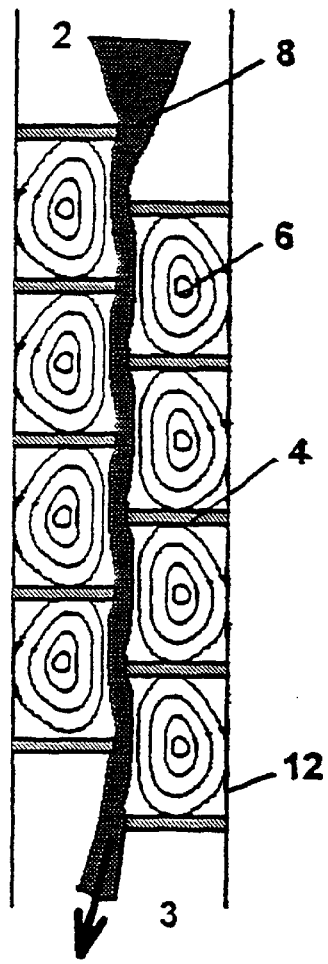
FIG. 5 illustrates lateral aspects of the core-flow motion, including impingement with the fins of a SASO-device in accordance with a preferred embodiment of the present invention.
Figure 5B:
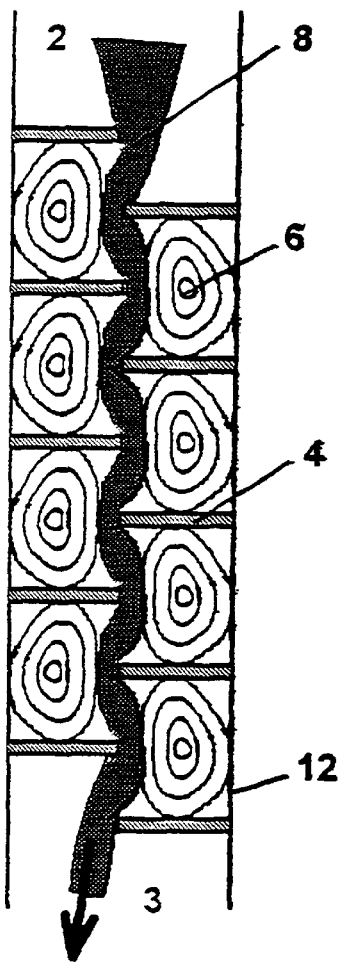

Fin (13) is a member of one of the two opposite fin arrays (14,15), forming the special internal geometry of the SASO-device. The objective of the fins is to force flow separation, and consequently to generate the vortical flow patterns. The fins may be positioned perpendicularly to the conduit walls, thus facing the flow, as illustrated in FIG.-1b, Alternatively, the fins may be inclined with respect to both the general core-flow direction and the conduit walls. The surfaces of the fin may be flat or of any other predetermined surface geometry, to manipulate the separation characteristics. A typical fin span of a fin from one fin array is denoted by the dimension "b", as shown in FIG.-1b. The fin span of a fin of the opposite fin array, closest to the first fin of the first fin array, is denoted by "c". The fin span of both fin arrays can be uniform as illustrated in FIG.-1b, or varying. The fin tip (16) may be sharp or blunt, or of any reasonable shape. Preferably each of the fins substantially blocks half of the conduit, thus "b" and "c" are each substantially half of the hydraulic diameter "a". The gap between the two opposite arrays of fins is "d"=a−(b+c), as shown in FIG.-1b. There are three practical possibilities for the value to "d":

d is greater than zero (see FIG.-6b, 212): An almost straight core-flow is developed as shown in FIG.-5a.

d approaching zero (see FIG.-6b, 211): The gap is substantially diminished and the core-flow becomes sinusoidal as illustrates in FIG.-5b.

d is smaller than zero (see FIG.-6b, 213): The fins partially overlap and the sinusoidal motion is amplified.

In fact, for the purposes of implementation of the principles of the present invention, the absolute value of "d" should be of a smaller order than the lateral dimension of the conduit "a". Preferably said absolute value is not more than 20% of the adjacent lateral width of said conduit.

Figure 5C:
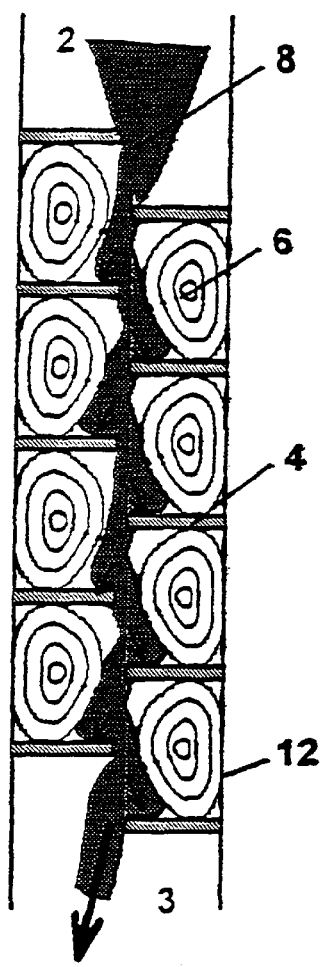

The core-flow laterally sinusoidal motion does not exclusively depend on the gap "d" but also on the geometrical details of the fins. In addition, the laterally sinusoidal motion may be amplified when the through flow Reynolds Number increase. When intensive core-flow motion exists, local impingement of the core-flow at the edge area of the fins facing surface may be developed as shown in FIG.-5c.

The fin shape, and in particular the shape of the fin tip, may significantly affect the SASO-device performance, since the flow separates from the fin tip. The fin tip can be sharp (FIG.-6c,230), round (FIG.-6c,231) or of blunt cut (FIG.-6a, 232,233). The fin tip is usually a curve in real three dimensional cases, and the "separation point" is in fact a "separation curve", which is substantially normal to the core-flow motion direction. The "separation curve" may be a straight line, or of any predetermined curvature, in correspondence to the fin tip curvature or the lateral distribution of the fin span. The fin span can be laterally uniform (FIG.-7c, 241), roundly curved (FIG.-7c, 242), symmetrically "V" shaped (FIG.-7c, 243), or laterally inclined (FIG.-7c, 244), The "separation curve" may be fixed (stationary) to a substantially sharp or blunt fin tip, or of a non-stationary behavior. The non-stationary behavior can be dictated by the use of a round fin-tip. The fin surface may be smooth or rough, to generate small scale boundary layer turbulence. In particular, by using roughness in the fin-tip region, especially in round fin-tip cases, the characteristics of the flow separation might be manipulated. Unsteady character of the flow separation may significantly improve the SASO-device performance, as it may trigger complex unsteady vortical flow patterns that may block the through flow more efficiently, thus the parasite MFR of the vacuum support system can be further reduced.

In practice, a SASO-device includes a plurality of fins. Thus various fin combinations may be configured inside the conduit, to provide a SASO-device with improved characteristics. Without derogating generality the following combinations are available:

One fin type with constant geometrical profile throughout the entire SASO-device.

One fin type, but the fins geometrical profile change in the downstream direction.

For example, a divergent distribution of the free gap Ads (see FIG.-7d), or alternatively, a convergent distribution.

A combination of fin types. Although the use of one fin type is preferable.

The fins may be inclined relative to the main flow motion.

Any shape of fin, of any geometric details mentioned above, is allowed in the SASO-device, as long as the fundamental SASO-idea of vortical aerodynamic blockage mechanism is established, as a result from the flow separation off the fins.

The last geometrical element to be defined is the SASO-cell (17), shaded by diagonal lines in FIG.-1b. SASO-cell is a cavity that is bounded by two consecutive fins (18,19), the conduit wall (20), and the conduit's center-line (21). The SASO-device comprises two substantially opposite arrays of consecutive SASO-cells, where in opposite each SASO-cell of the first set there exists one fin of the opposite set, as shown in FIG.-1b. The basic lateral scale of SASO-cell is substantially the fin height, "b" (or "c"), or approximately half of the conduit lateral dimension, "a/2". The longitudinal gap between the fins, denoted by "e" in FIG.-1b, is the SASO-cell pitch. Although it usually is the case, it is not always necessary to place the opposite fin facing the exact center of SASO-cells of the opposite set, and it may be off the center. The SASO-cell pitch "e" can be constant, or of any practical downstream distribution.

In the cavity of the SASO-cell, the primary vortices are developed. The developed vortices are dynamic fluid structures that develop and survive within the SASO-cell, only when through flow is maintained inside the conduit. A vortex is a rotational motion of fluid around a fixed or an unsteady virtual axis. A steady vortex is a fully developed vortex, that induces a steady velocity field. In cases of a steady state situation, the primary vortex is characterized by closed stream-lines as illustrated in FIGS. 1a and 1b. It means that there is no mass flow normal to the vortex, thus it may serve as an efficient fluid barrier, just like the solid fins that face the incoming flow. When the primary vortex is of unsteady nature, but still maintained substantially within the SASO-cell, it may be distorted while moving periodically, or even chaotically. In such unsteady cases, the vortex streamlines are not necessarily closed and there is some mass exchange with the core-flow. Nevertheless, practically speaking, the vortex still serves as an effective "fluid" barrier. The unsteady nature of the primary vortices is of great importance in accordance to the present invention, because it can trigger complex interactions between the vortices and the core-flow. It can also trigger longitudinal interactions between the vortices. These interactions can be intentionally invoked and may significantly improve the aerodynamic blockage efficiency, and further enhanced the performance of the SASO-based vacuum support system of the present invention.

The vortical flow patterns strongly interact with the walls of the SASO-cell, involving viscous wall friction. The cases of steady and unsteady viscous interactions should be treated separately. Without derogating generality, FIGS. 3a–3h illustrate some possible interactions between various vortical flow patterns with the SASO-cell walls, where interactions with the core-flow may be involved. An interaction of a steady character is shown in FIG.-3a, where the principle substantially stationary vortex (6) is developed inside the SASO-cell. FIG.-3b illustrates the case where weak non-steady interaction, mostly of a time-periodic nature, takes place where the vortex deforms and shifts inside the SASO-cell, and interacts with the core-flow. As the vortex swings about (in the directions represented by arrows (30)), it causes the core-flow to adjust, by locally altering its course to follow the free passage, which shifts accordingly in the direction of arrows (31). The aerodynamic blockage effect may be significantly augmented when unsteadiness is introduced to the flow, for example by selecting the desired scales of the SASO-device. Alternatively speaking, the two fundamental features of the present invention, the drastic reduction of MFR and a significant increase of ΔP, are both modified. Generally, in cases of unsteady vortical patterns, the various aspects of the aerodynamic blockage effects must be treated in terms of time-averaged quantities.

The interactions of the SASO-cell walls with the flow that are shown in FIGS. 3a and 3b, shed a light on a distinctive aspect of the present invention, resulting from its unique vortical flow mechanism. In such cases, the viscous friction force that acts on the conduit walls is in opposite direction to the viscous force found in conventional or labyrinth-like conduits. It is the vortices inside of a SASO-cell that alter the direction of the viscous friction force. By employing SASO-technology, the direction of the wall viscous friction force can be manipulated, by using secondary vortical flow patterns. Secondary vortices (33) of essentially stationary nature may develop between the principle vortex and the SASO-cell corners (see FIG.-3c). Such small scale vortices can be intentionally initiated with the aid of a special cell geometry, see FIG.-3d, where the conduit wall (12) is provided with a extruding construction element (34). Alternatively, when the fin span "b" is enlarged a secondary vortex (35), of scales similar to these of the principal vortex, may develop (see FIG.-3e). This secondary vortex (35) is usually of a reduced circulation. In other cases, the principle vortex (6) may be forced by the core-flow (8) to a declined orientation inside the SASO-cell cavity. In such a case, a small secondary vortex (35), or several vortices, may develop in the "unoccupied" corner region of the SASO-cell, as shown in FIG.-3f. The resulting vortices illustrated in FIGS. 3c, 3d, 3e and 3f, are in fact a few of many possible SASO-technology tools for manipulating the viscous friction force. Such manipulations may significantly modify the two fundamental features of the SASO of the present invention—reducing MFR and increasing ΔP, thus The novel vacuum support system may be modified by further decreased parasite MFR and by reducing the noise.

A "free" (geometrically unforced) developed vortex has its own "natural" scales (by this term we mean integrally defined scales associated with its vorticity), that depends on the flow characteristics and its own formation history. The questions of matching between the vortex integrally defined natural scales, and the actual space available inside the SASO-cell, expressed by the term "spacing", is of great importance in the present invention. In the two-dimensional case, the vortex spatial growth is bounded by the SASO-cell walls in a two-dimensional manner. Thus only the vortex cross-sectional aspects of the spacing are relevant to the present discussion, where the geometrical limitation in the passive direction, is further discussed. In certain situations, where the SASO-cell dimensions are effectively larger or smaller than the vortex integrally defined natural scales, the vortex, practically speaking, does not achieve its full potential, thus it is less effective with respect to the aerodynamic blockage mechanism. States of "optimal spacing" might be achieved, practically speaking, when the size of the SASO-cell is slightly smaller than the vortex integrally defined natural scales. In such a case the vortex practically achieves its full potential while it is slightly deformed and intensively interacts both with the SASO-cell walls and with the core-flow. The spacing issue is a most important aspect that affects the SASO-device performance. It is the task of the SASO-technology to define what is the optimal configuration with respect to a specific SASO-application, and to provide the practical design guidelines (to achieve optimal spacing), for a SASO-device design of the best performance, to be used in vacuum support systems. For the case of steady vortices pattern, a recommended approximate ratio of e/b is in the range of 1:1 to 1:2, and preferably about 1:1.5. When the SASO-conduit internal configuration is more complex, in particular when three dimensional elements are involved, or in more complex vortical flow patterns, of steady or non-steady nature, or when secondary vortices are developed and interact with the core-flow and/or the primary vortices, or when the vortical flow pattern is inherently three-dimensional, this ratio may no longer be considered as an initial guideline of the design.

The SASO-device vortical flow pattern becomes more complex and involves unsteady flow mechanisms, as the Reynolds number (Re) increases. When Re number is increased, unsteady secondary vortices may be developed between the core-flow and the principal vortex. The typical scales of these vortices are similar to the core-flow width, and is significantly smaller than the principle vortex. These are shed vortices that may develop and travel downstream in a periodic mode, with complex periodicity or even in a chaotic way. These shed vortices violently interact with the core-flow, and a core-flow of unsteady character is attained. When the shed vortices directly confront the core-flow, unsteady core-flow "break-down", may take place. In addition, local impingement of the core-flow on the facing fins may occur. Shed vortices (36) may exist locally inside the SASO-cell, as illustrated in FIG.-3g. They can also travel downstream and interact with the consecutive SASO-cells, see FIG.-3h. The unsteady nature of the flow may significantly modify the aerodynamic blockage effect, and affect the fundamental features of the present invention, i.e. reducing the MFR and increasing the ΔP. It is within the scope of SASO-technology to implement and harness the benefits of the unsteady vortical flow patterns.

The appearance of traveling vortices which strongly interact with the core-flow and with the principle vortices may create downstream propagating wavy modes, where a plurality of vortices "communicate" with each other. As a result of direct interactions between the secondary vortices and the core-flow, instantaneous large changes in the lateral and in the longitudinal core-flow velocity may be locally developed. Consequently, the strongly disturbed core-flow may impinge in an unsteady fashion, on the facing fin. As the Reynolds number (Re) is further increased, (for example, by increasing the SASO-conduit lateral scale), more secondary vortices may be generated, and the direct interaction between the vortices and the core-flow becomes more violent. Consequently, the aerodynamic blockage effect can be significantly augmented. Furthermore, SASO-technology provides the necessary know-how required to utilize these unsteady vortices/core-flow interactions for the design of SASO-devices of improved characteristics. The present invention covers all these unsteady secondary vortices patterns. Therefore, the SASO-idea is hereafter extended to include also secondary shed vortices that may instantaneously block the core-flow.

The core-flow lateral scale (or the core-flow width), is significantly narrower than the SASO-conduit hydraulic diameter. The core-flow velocity distribution and its width are essentially determined by the external pressure drop, the various SASO-device internal configurations, and particularly, by the vortical flow-field patterns that are developed inside the SASO-conduit. When the flow accelerates from rest, the initial core-flow is wider, characterized by a sinusoidal downstream fluid motion of large lateral amplitude, bounded by the fins and the conduit walls. At this first instance, the flow is very similar to the flow in conventional labyrinth type devices. At a later stage, a totally different flow-field develops inside the SASO-device conduit. The flow can not follow the internal passage defined by the walls of the special SASO-device configuration. Consequently, the flow separates at the fin tips, and two opposing rows of intensive principle vortices are developed inside the SASO-cells. These rows of vortices limit the passage of the flow through the conduit, and a detached severely narrower, core-flow is obtained. In many cases, the core-flow involves unsteady vortical flow patterns, with respect to the predetermined Re number (when Re number is increased). Re number can be specified by the "hydraulic diameter" of the SASO-conduit and by the operational vacuum level of the vacuum support system.

The core-flow characteristics are affected by the geometry of the SASO-device internal configuration, and to a great extent by the gap, "d", between the two opposite arrays of fins. In most cases, as "d" is reduced, the core-flow becomes narrower, but as "d" is further reduced, a lateral sinusoidal motion may develop. Furthermore, as the gap is closed ("d"=0), or when the fins overlap ("d"<0), the lateral sinusoidal motion is augmented and the core-flow width may increase. These two contradictory effects bring about the notion that values of "d" between b/10<d<-b/10 may be particularly preferable. As one of these contradictory effects intentionally becomes dominant, it may serve practical requirements, when, for example, the reduction of MFR is of interest, but not the maximizing of ΔP, and vise versa.

It has to be noted that as the degree of fin-overlap increases above a certain value, the core-flow might be forced to reattach to the conduit walls. In this case the SASO-idea is no longer sustained, the flow adopts a labyrinth type of motion and the vortical flow pattern disappears. Nevertheless, as long as the core-flow is substantially separated from the fins, and is thus basically different from labyrinth flow types, and as long as the core-flow is dominated by the various types of vortical flow patterns, that block the flow, it maintains the SASO-idea described in the present invention. SASO-idea is directly implemented to improve vacuum support system, especially with respect to the parasite MFR problem.

The typical width of the core-flow is the effective hydraulic diameter of the SASO-cell conduit. Thus, a SASO-device that has a large lateral physical size ("a"), is practically of a much narrower effective width, with respect to the MFR, compared to conventional conduits. In typical cases, the physical size and the effective size, regarding MFR through the SASO-conduit, differ by orders of magnitude. This dual-scale behavior (small effective scale in respect to the MFR and large physical dimensions), is a fundamental feature of the present invention. In particular, the large physical scale is important with respect to significantly reducing the risk of contamination blockage in the case of fluids containing contaminants. It is further suggested that the physical passage inside the SASO-conduit (i.e. the winding passage within the conduit, between the fins) be greater than the envisaged size of the contaminant particles inside the fluid by at least 10%. The contaminants size can be predicted when the SASO-device is designated for a specific SASO-application, and therefore SASO-conduit scales relevant to that physical passage can be specified.

The discussion until now was limited to a two dimensional case of the SASO-device, in order to simplify the presentation of the flow field and its structure. However, for a true three dimensional SASO-device the "passive dimension" (passive—from topological point of view), physical scale denoted by the width "w" must be large enough so that the viscous edge effects should be negligible. Too small a "w" will render the SASO-device ineffective, as the large velocity gradient between the vortices and the side walls will attenuate the vortices intensity. It is recommended that the minimal width therefore should be at least of the same order of magnitude as "b" (see FIG.-1b).

The Self-Adaptive Segmented Orifice (SASO), of the present invention brings about two principal concepts:

The Self-Adaptive Gate Unit.

The Segmentation concept

A discussion of these two concepts follows.

Figure 4A:
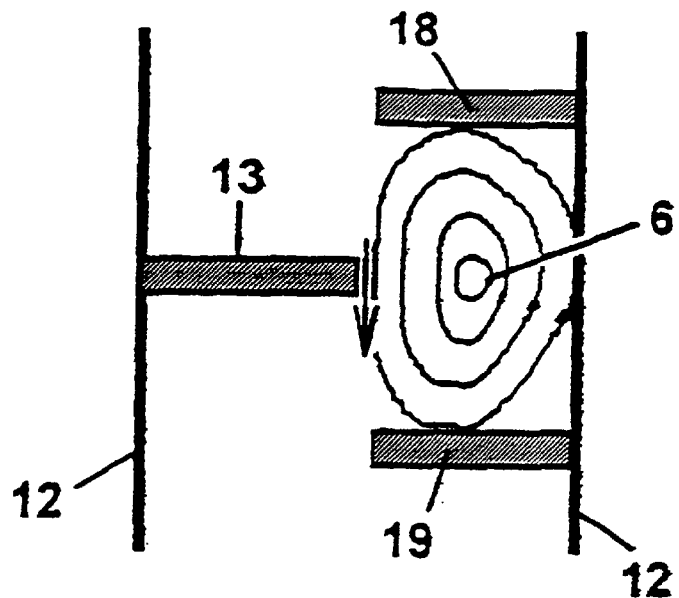
FIG. 4a illustrates a sectional partial view of a SASO-device in accordance with a preferred embodiment of the present invention, depicting Radial Self-Adaptive Gate Unit (SAGU).

Each vortex and the opposing fin define a "Self-Adaptive Gate Unit" (hereafter referred to as SAGU), which is the fundamental unit of the present invention as illustrated in FIG.-1b, depicting a sectional view of a SASO-device in accordance with a preferred embodiment of the present invention. A SAGU is a "virtual" orifice unit consisting of two complementary elements, a solid element—the fin, and a dynamic element—a vortical fluid structure positioned between two fins of the opposite fin array (15). Hence, SAGU is a dynamic entity that exists as long as fluid motion through the conduit is maintained. Two distinct SAGU types are relevant for the present invention:

Radial SAGU—where the fin (13) substantially points toward the vortex (6) core, positioned in the opposite SASO-cell, between two consecutive fins of the opposite fin array (18,19), as shown in FIG.-4a.

Figure 4B:
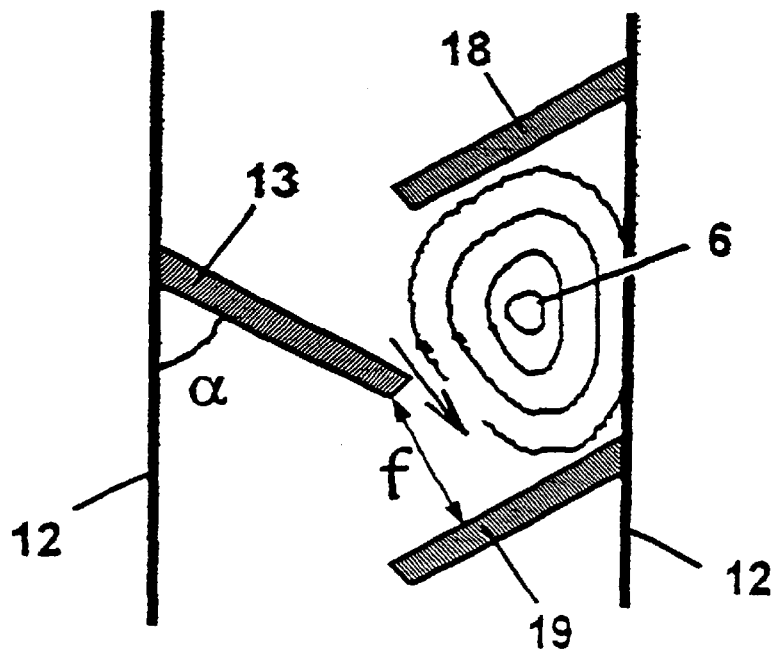
FIG. 4b illustrates a sectional partial view of a SASO-device in accordance with a preferred embodiment of the present invention, depicting Tangential Self-Adaptive Gate Unit (SAGU).

Tangential SAGU—where the fin (13) is substantially tangential to the circular motion of the vortex (6), with the fins inclined with respect to the conduit wall (12), defining angle "α" between the fin and wall (12), and introducing a typical distance "f" which is the shortest distance between the tip of a fin in one fin array and the closest fin of the second substantially opposite fin array, see FIG.-4b. As "f" defines in effect the gap between the opposing fin arrays, the lengthy account given above regarding gap "d" applies to "f" with the necessary amendments.

A Hybrid SASO-device consisting of both SAGU types is also included in the scope of the present invention.

Due to a significant increase of the fluid-dynamic resistance, a SASO-device incorporating several SAGUs, may be of appealing engineering advantage in two aspects:

The through-flow is substantially blocked by the vortices, and consequently MFR is dramatically reduced, relative to the MFR through a conventional conduit of the same hydraulic diameter.

Significantly increased internal pressure drop (ΔP), is developed within the conduit, in comparison to conventional conduits.

It has to be emphasized here that these two aspects are functionally related, and it is SASO-technology that manipulates and exploits this mutual dependence.

The second fundamental substance of the SASO in accordance with the present invention is the segmentation concept. In practice, it is beneficial to employ a combination of SAGUs, to configure a well functioning SASO-device. This Is the essence of SASO-technology that provides SASO-devices with new or improved predetermined feature, to fulfill specific engineering requirements for various vacuum support system applications.

A fundamental aspect of the present invention is the self-adaptive nature of SASO-devices. Such devices respond differently from conventional devices to changing or unsteady external conditions. In particular, SASO-devices are superior when external conditions are not stable or intentionally altered, or when adjustable functionality is required to meet different engineering requirements. Ultimately, the dynamic nature of the vortical flow pattern and the possible interactions of the vortices with the core-flow render the SASO its adaptive behavior.

SASO-technology can be used to manipulate two essentially different engineering aspects:

A SASO-device can be used to limit or control the motion of any fluid through the conduit, by generating aerodynamic blockage.

A SASO-device can be used to withhold a substantial internal pressure drop by generating aerodynamic blockage.

The fundamental idea of the present invention is manifested by the following statement: the SASO in accordance with a preferred embodiment of the aerodynamic blockage mechanism imposed by the Self-Adaptive Segmented Orifice of the present invention is effective as long as the SASO-device special configuration imposes the development of the vortical flow field patterns, thus achieving substantial control over the flow through the conduit.

When the flow through the conduit commences, vortices are not yet developed and therefore initial MFR is relatively large (during a transitional period). A short while later, as the transitional period is over, the vortical flow pattern is fully developed and efficiently blocks the flow through the conduit. As a result, MFR is drastically reduced and the internal pressure drop (ΔP) is significantly increased. This transitional event is responsible for the self-adaptive nature of the present invention. When a fluid starts flowing through the conduit, the SASO-device "reacts" in a self-adaptive manner, as the vortical flow pattern is instantly developed and aerodynamically blocks the flow.

The transitional period also exhibits the multiple-functioning nature of SASO, a most important feature of the present invention, where different performances are exhibited by the SASO-device at different working conditions, or when it operates at varying working conditions. The characteristics of the vortices and consequently MFR and ΔP, strongly depend on various flow-field phenomena and, most importantly, on the internal configuration of the SASO-device conduit that dictates the internal vortical flow patterns.

The Self-Adaptive Gate Unit, SAGU, is the basic component of the present invention that features both structural elements and a flow-field element. Therefore a SAGU may be regarded as a "dynamic" type of a gate. A SAGU includes the following elements:

One SASO-cell, on one side of the SASO-device conduit walls.

One fin of the opposite array of fins (on the opposite conduit wall).

One principle vortex, with possible secondary vortices of steady or non-steady nature.

An illustration of one SAGU, shaded with diagonal lines, is given in FIG.-1b. A SASO-device may consist of one or more SAGUs, sequentially arranged in an asymmetric configuration as shown in FIG.-1b. When a plurality of SAGUs are used, unsteady vortical flow patterns, strong vortices/core-flow interactions and communication between SAGUs may significantly modify the practical characteristics of the SASO-device.

For the clarity of the presentation, only one type of SAGU was introduced so far. In accordance to the SASO of the present invention, two distinct types of SAGU may be considered:

a Radial SAGU—characterized by a core-flow being substantially perpendicular to the SAGU fins. This SAGU type is the one that was presented above, and illustrated in FIGS. 1a, 1b and 3, and further described in FIG. 4a.

a Tangential SAGU—characterized by a core-flow being locally substantially parallel to the SAGU fins, as shown in FIG.-4b.

a combination of Tangential and Radial SAGUs may be implemented in a single SASO-device, to fulfill different SASO-application requirements, and is also covered by the scope of the present invention, as long as the SASO-idea is maintained.

The definition of the physical dimensions of the Tangential SAGU are similar to the dimensions defined for the Radial SAGU, except for the gap "d" that becomes irrelevant. Two variables, the angle "α", and the distance "f", define the effective gap of the Tangential SAGU as shown in FIG.-4b. Angle "α", defines the orientation of the fins with respect to the conduit wall, and does not have to be identical for all the fins. The dimension "f" is the shortest distance between the tip of a fin from one set to the opposing fin of the second set, as shown in FIG.-4b. The basic idea of the present invention, generating an aerodynamic blockage by vortical flow patterns, is also dominant in the case of the Tangential SAGU, but the details may be different.

The essential difference between the Tangential SAGU and Radial SAGU, is the local wall-jet flow that is developed due to the core-flow motion that is parallel to the fin. Two significant aspects distinguish the Tangential SAGU flow-field from the Radial SAGU flow-field are the increased amplitude of the core-flow lateral wavy motion, and the relatively violent local impingement of the core-flow on the facing fins (see FIG.-4a for a comparison with a Radial SAGU). Consequently, a different distribution of fluid-dynamic forces is generated upon the SASO-cell walls. These phenomena might significantly affect the main features of the present invention, namely, decreasing MFR and increasing ΔP, an important features to be beneficially implemented in the novel vacuum support systems of the present invention.

Another distinct aspect of the Tangential SAGU in comparison with the Radial SAGU, is the change in fluid-dynamic resistance, when the fluid flow direction is reversed. It is due to the fact that while the Radial SAGU is of a "symmetric" nature with respect to flow direction, the Tangential SAGU has an "asymmetric" nature, in that respect. This tangential SAGU "dual behavior" may be beneficial, for instance, when a different fluid-dynamic resistance is required to inject or suck a fluid, in different operational stages, with different MFR requirements.

The second principle concept of the SASO of the present invention, and the SASO-technology is the segmentation concept. It states that specific engineering requirements can be fulfilled by a sequential arrangement of a plurality of SAGUs. Thus, a SASO-device can be configured with a plurality of identical type SAGUs, or by using a combination of more than one SAGU type. In other words, each SASO-device is characterized by a specific SAGU arrangement, the number of SAGUs, and the types of SAGUs used. In this way the same basic components (SAGUs), can be re-utilized to design SASO-devices of different characteristics, to be implemented for a wide range of SASO-applications. Thus, the segmentation concept, included in the SASO-technology procedure of design, involves the selection the SAGU types and the optimal number of SAGUs to be used, and the SAGU axial arrangements along the specific SASO-device.

Therefore, any combination of SAGUs, in corporation with any configuration of the SASO-device inlet or outlet sections that are assembled together in the design, are all covered by the present invention. It is further noted that any variant of a SASO-device that is based substantially on the SASO-idea of vortical aerodynamic blockage including possible incorporation with various passive or active means, of various engineering disciplines, is covered by the scope of the present invention to be implemented in vacuum support systems.

The present invention involves a wide variety of SASO-devices with distinct configurations. Some optional SASO-devices are hereafter described, without limiting the scope of the invention as defined by the appended Claims.

Figure 7A:
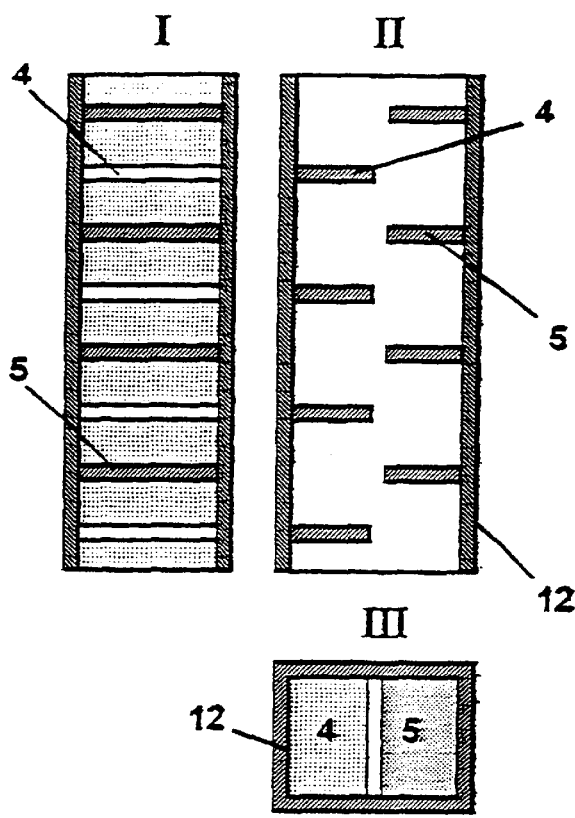
FIGS. 7a–c display a three-dimensional view, and three cross-sectional side views of a SASO-device in accordance with a preferred embodiment of the present invention, and presents optional fin-surface formation, in accordance with a preferred embodiment of the present invention.
Figure 7B:
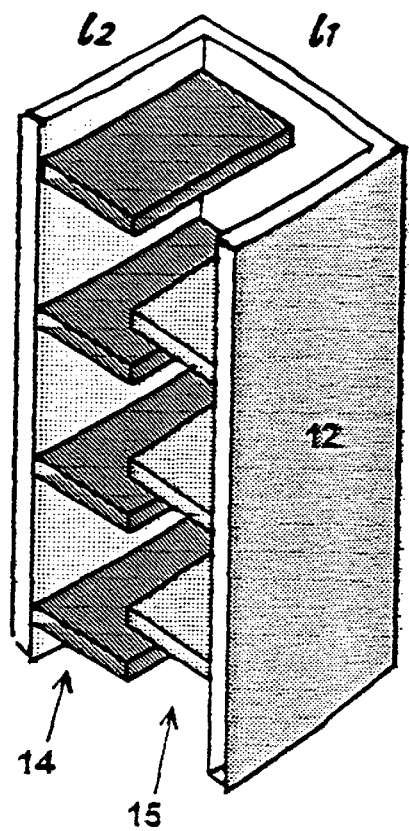
Figure 7C:
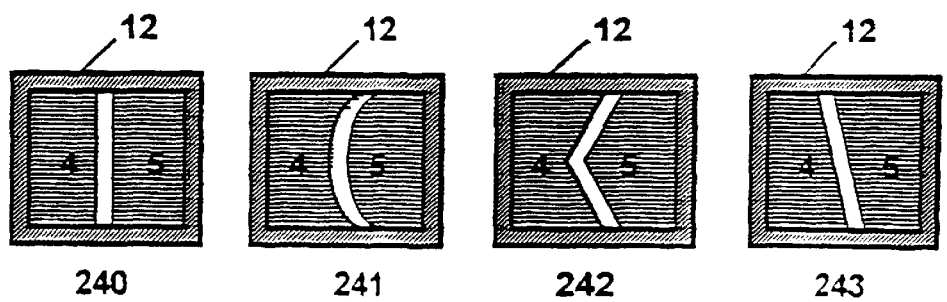

The basic SASO-device is the "SASO-tube" of rectangular cross section, illustrated in FIG.-7a. It is essentially a three-dimensional SASO-device, where the third dimension of typical width "l2" is the "passive direction". Although the main fluid dynamic patterns are of a two-dimensional character, secondary flow effects of three-dimensional character may develop. The flow is of a three-dimensional nature when approaching the side walls (of the "passive" direction). As "l2" (FIG.-7a) reaches a sufficiently small value, the flow becomes of significantly three-dimensional nature and viscous effects may significantly affect the SASO-tube performance. In particular it may cause an intensive decay of the vortical flow patterns, thus the aerodynamic blockage mechanism may be severely deteriorated. It is recommended that the size of "l2" should be, at least, similar to "l1" to practically avoid the above wall effects. Two side views and one top view of the basic two-dimensional configuration, are illustrated in FIG.-7b. Lateral side view I shows the "active" dimension, with the two opposite fin arrays. Side view II shows a sectional view of both fin arrays appearing interlaced (this is of course not true, but the angle of view provides the interlacing effect). Top view III shows the first two opposite fins (4,5) at the inlet. As already mentioned, fins of different laterally span distribution are optional, as shown in FIG.-7c. FIG.-6b illustrates several optional fins cross section or fins profile, The fins profile can be rectangular (212), sharp (211), curved (210) or of different fin's side surfaces (215). The arrays of fins can overlap (213) or not (212) or with no gap between them (211). The fins can be mounted perpendicularly to the SASO-conduit walls (212), or inclined with respect to the SASO-device conduit wall (214). The fin arrangement can provide a different behavior with respect to the direction of flow (214–215) or to be not sensitive to the flow direction (210–213). By using different fins, various SASO-tube characteristics may be manipulated to fulfill specific requirements. This basic SASO-device consists of a predetermined number of identical SAGUs, as stipulated by SASO-technology procedure of design, depending on specific SASO-application requirements for well-functioning vacuum support systems.

A modified SASO-device, namely a "SASO-slot", is defined in cases where "l2" is the lateral length of the fin along the passive direction is considerably larger then "l1", the second lateral direction, as illustrates in FIG.-6a (222). Within this basic SASO-slot of stretched rectangular cross-section, the flow is essentially two-dimensional, as the lateral scale of the boundary layers and the resulting viscous effects, at the edges of the slot, is practically negligible in respect to "l2". Consequently, the one-dimensional lateral suppression (by the vortices) of the core-flow width, or, alternatively speaking, the aerodynamic blockage mechanism, may significantly improve.

Figure 7D:
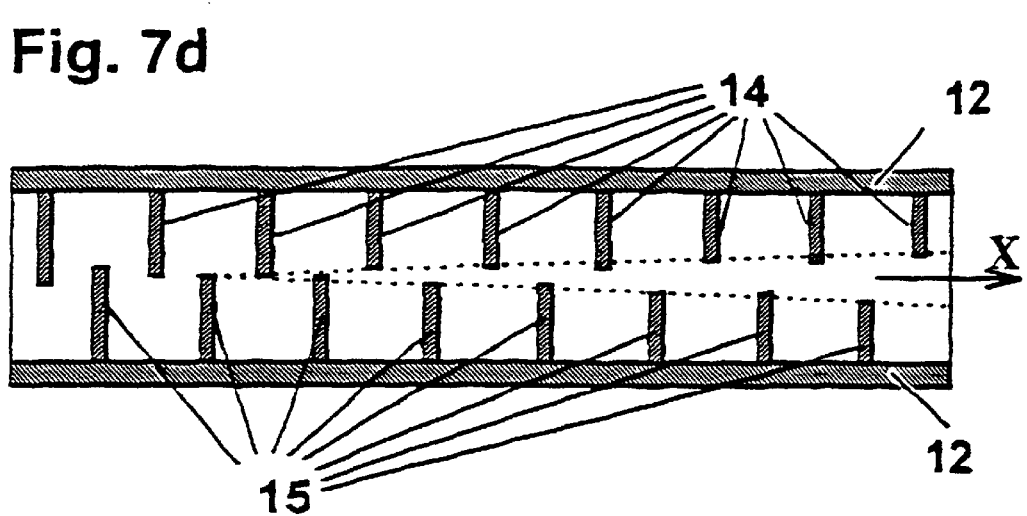
FIGS. 7d–f depict three optional fin alignment and fin construction incorporated in a SASO-device, in accordance with a preferred embodiment of the present invention, rendering a "Directional" SASO-device.
Figure 7E:
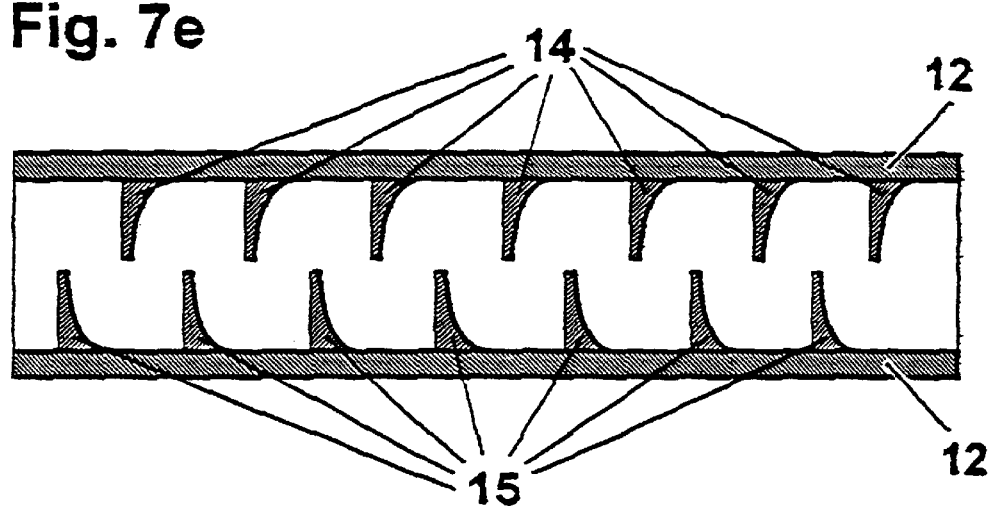
Figure 7F:
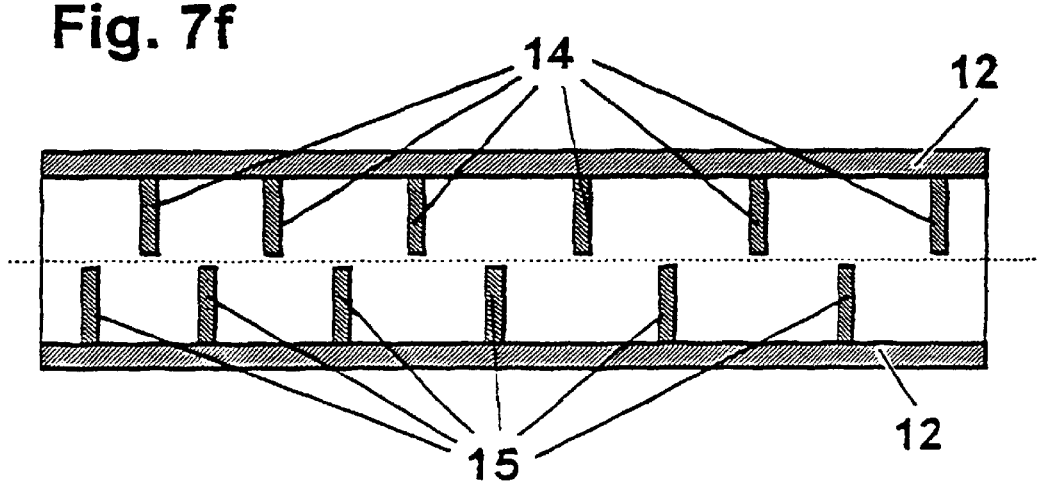

A Directional SASO-device embodiments are given in FIGS. 7d, 7e and 7f, where the fluid-dynamic resistance becomes significantly different when the flow is reversed in direction. The asymmetric profile (215) and the inclined fins (214), see FIG.-6b, are directional SASO-device. Also the convergence and divergence conduits (FIG.-2b 203,204) establish a directional SASO-device. Additionally, FIG.-7d is a "directional" SASO-device, where the span of the fins (14,15) is shortened gradually in a predetermined flow direction x. In this embodiment the core-flow is divergent in direction x, or convergent if the flow direction is reversed, as the aerodynamic resistance is not similar in both directions. FIG.-7e shows a different "directional" SASO-device, where one surface of the fin (14,15) is, for example, flat and the opposite side of the fin is curved. In this case the characteristics of the vortical flow patterns and the core-flow are manipulated differently, and the aerodynamic resistance varies, when the flow changes its direction. In fact, a SASO-device based on Tangential SAGU is a typical example of a Directional SASO-device. FIG.-7f show different "directional" SASO-device, where the pitch or the distance between two consecutive fin changed gradually in a predetermined flow direction x.

Figure 8A:
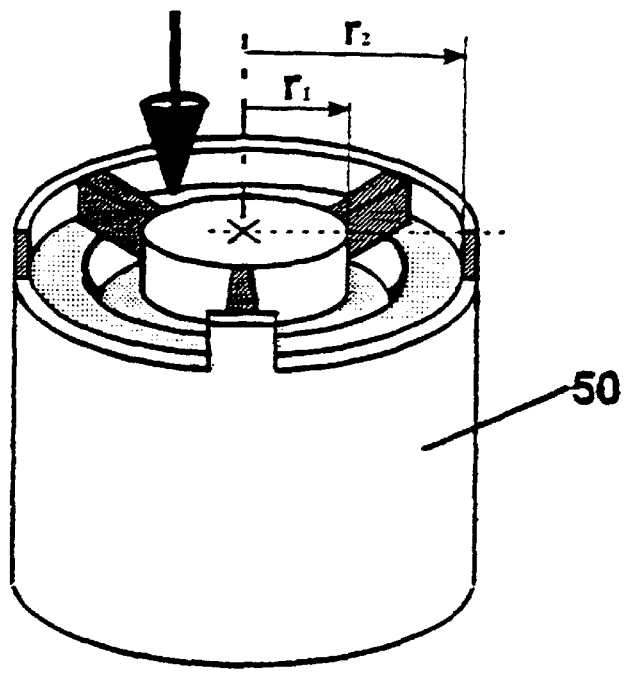
FIG. 8 illustrates an annular SASO-slot, in accordance to a preferred embodiment of the present invention.
Figure 8B:
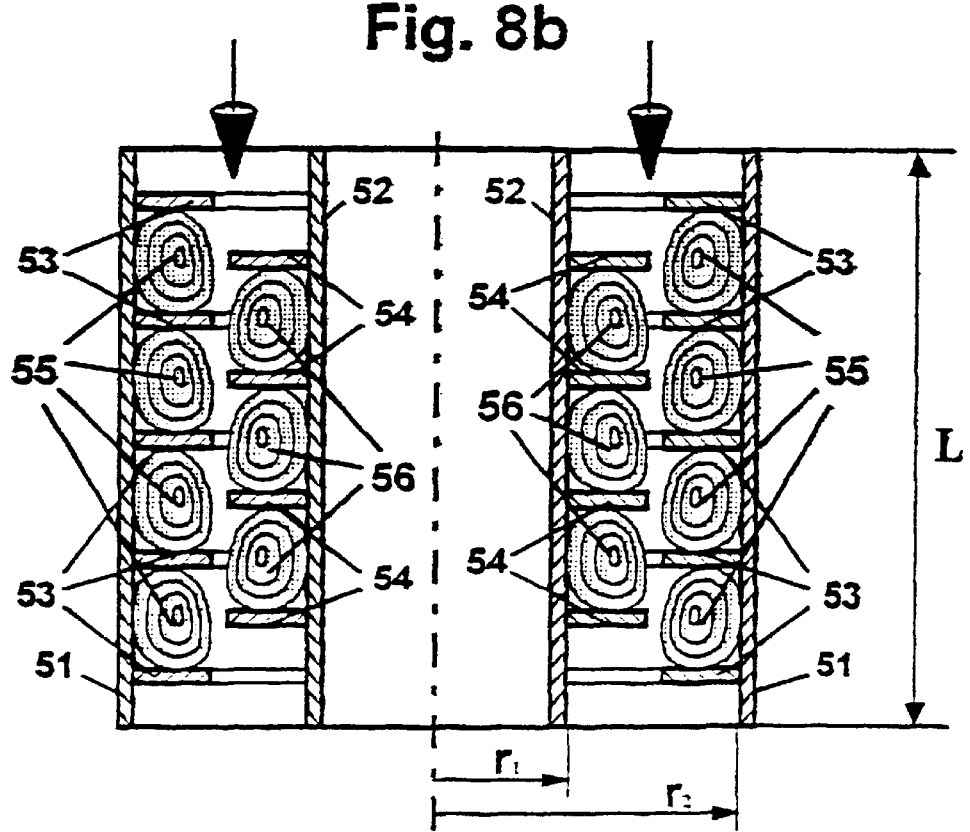

The examples discussed so far are all dealing with open curved vortex lines (having two ends). A special case of the SASO-slot is the annular SASO-slot, shown in FIG.-8, which exhibits the possibility of creating two arrays of closed-loop vortices (in this case, two arrays of vortex-rings). FIG.-8a illustrates an annular SASO-slot (50), having two opposite ring-shaped fins arrays (the top two fins are shown in FIG.-8a, and see also fins (53, 54) in FIG.-8b), where the annular SASO-slot conduit has an internal wall (52) of radius $r_1$, and an external wall (51) of radius $r_2$, as shown in FIG.-8b. FIG.-8b illustrates a sectional view of the annular SASO-slot, where two arrays of ring-shaped fins (53,54) are positioned within the internal walls (51, 52) of the annular conduit. The vortical pattern formed in an annular SASO-slot is in the form of two arrays of vortex-rings (55, 56). Note that in this configuration the core-flow suppression by the vortex-rings is also of a one-dimensional character.

Figure 9B:
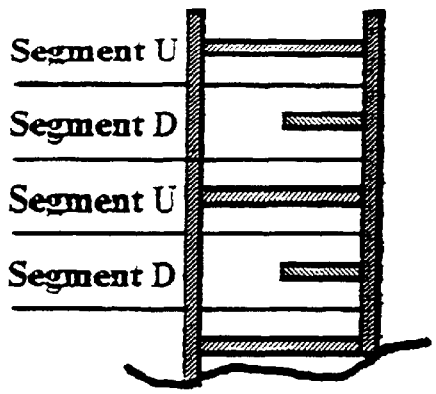
FIG. 9 illustrates a SASO-device, in accordance with another preferred embodiment of the present invention. with L-shaped fins (and U-shaped fins), exhibiting 3-dimensional core-flow suppression.
Figure 9A:
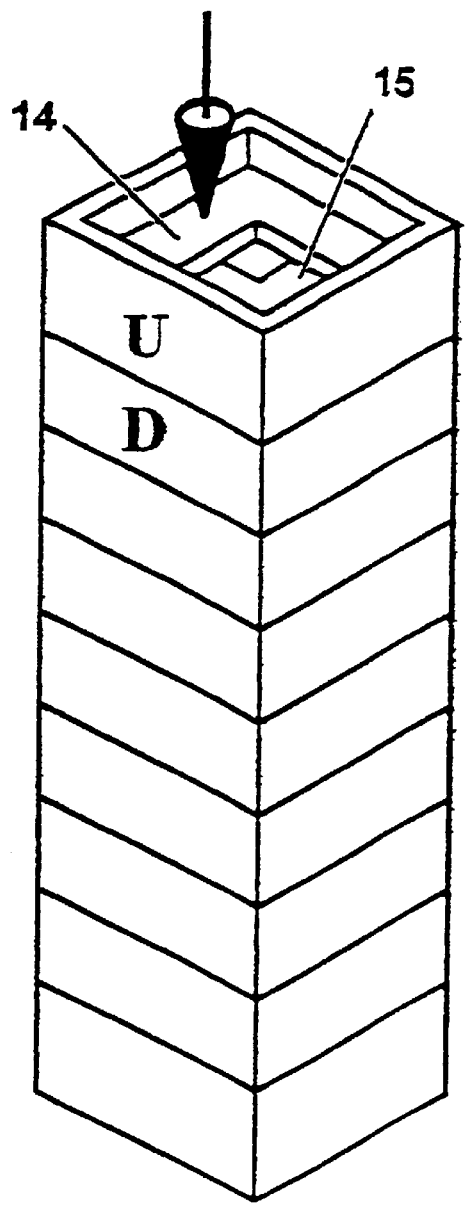
Figure 9C:
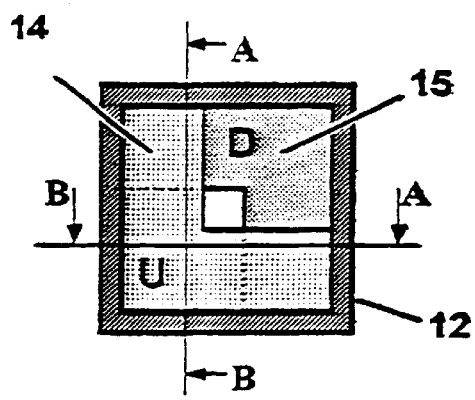

A different type of a SASO-device, of a three dimensional character, is presented in FIG.-9a. This type of a SASO-device has a conduit of lateral rectangular cross section (FIG.-9b) with "L" shaped fins (14,15), that are consecutively located at opposing corners. FIG.-9c depicts a longitudinal cross section view of the first two fins (segment U and segment D) of the SASO-device. In this three dimensional type of SASO-device, the core-flow is laterally suppressed by the vortices in a two dimensional manner.

Figure 9D:
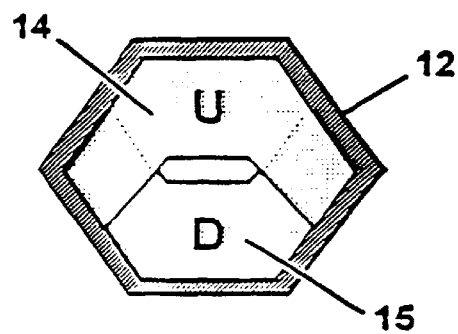

Such suppression is the most significant issue of three dimensional variants of SASO-device, where in a two dimensional SASO-device variants, the core-flow suppression is of one dimensional character. As a result of the two dimensional lateral core-flow suppression, the aerodynamic blockage efficiency of three dimensional SASO-device configuration is expected to improve. Another similar alternative is shown in FIG.-9d, where "U" shaped fins (14,15) are mounted within a conduit having a polygon cross-section.

Figure 10:
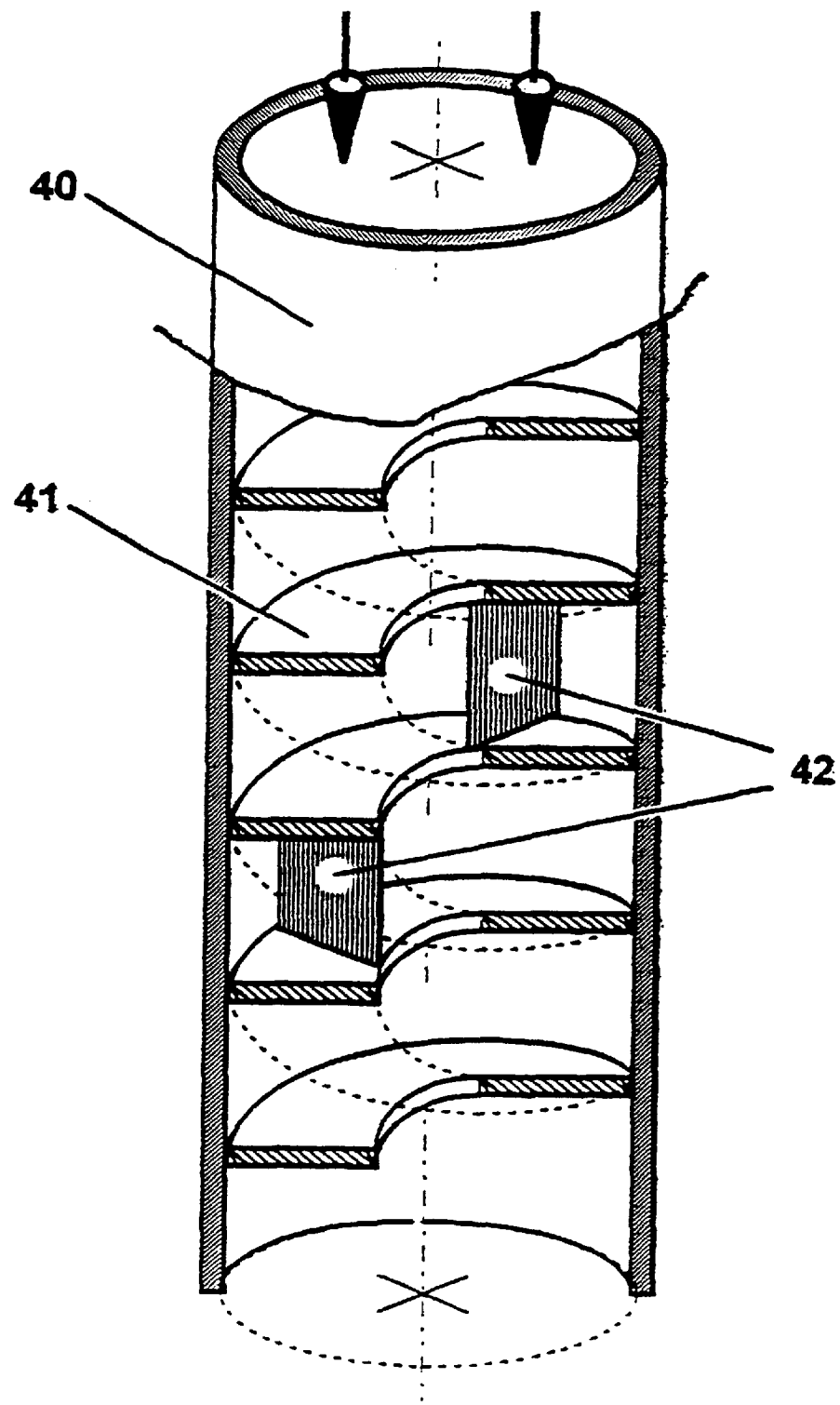
FIG. 10 illustrates a SASO-device, in accordance with another preferred embodiment of the present invention, with single helical fin, exhibiting 3-dimensional core-flow suppression and dual passage character.

FIG.-10 illustrates a longitudinal cross section view of a SASO-device comprising a conduit (40), here possessing circular lateral cross section, with a single fin (41) presenting an Internal helical structure. It is in fact one helical fin, optionally provided with barriers (42) distributed along the device to enforce flow separation and prevent a natural selection of a helical flow motion that may be triggered at specific combinations of geometrical parameters. Note that the presence of such barriers is not essential, but may improve flow separation. This is a three dimensional SASO-device type where the core-flow is being laterally suppressed from all directions in a two dimensional circumferential manner by the helical vortex developed. Therefore, such a configuration of SASO-device is essentially an efficient variant enhancing aerodynamic blockage effect. Furthermore, this configuration offers a dual passage for the fluid flow. The flow can separate from the fin and move in the central passage, or move in a circumferential direction along the fin. The geometrical design, with or without barriers, is aimed to make the flow chose the first route, and separate from the fin, filling the helical cavity behind the fin with a helical vortex, thus obtaining similar pattern as the SASO-tube described before. However, if a contamination of any kind is stuck in the central passage, physically blocking the flow locally, this type of a SASO-tube offers an alternative passage—the helical route—to overcome this obstacle locally, and then resume the central separation route, in a self adaptive manner or forced by the next barrier (if it exists). This dual passage character is of great importance since it offers a SASO-device with its advantages, that is "almost free" of mechanical blockage, and can thus operate well in applications where severe contamination environment exists. The central passage defined by the helical fin tip is of smaller order in comparison with the hydraulic diameter of said conduit. Preferably said passage is not more than 30% of the adjacent lateral width of said conduit.

Optionally, both fin ends may be provided with extruding rims, projecting substantially normal to the fin surface, used as a seat to hold the helical vortex at its both ends.

The internal features of SASO-devices (such as the fin construction, size, texture and shape, etc.) apply accordingly to the helical fin SASO-device too.

A self adaptive vacuum support apparatus in accordance with a preferred embodiment of the present invention can be a robot-arm containing one or few vacuum-conduits or, alternatively speaking, vacuum pads. Such a system may serve the SC industry, to hold a wafer fixed in stationary position, or to convey X from station to station. A vacuum support system may be a straight vacuum-feeder that includes a column of vacuum-conduits, to be used, for example, as a paper feeder that holds a paper edge. A vacuum support system can be a vacuum-frame, a flat surface in which a plurality of vacuum-conduits are used. One example for the use of a vacuum frame is the holding of a PCB substance during the AOI industry, where the vacuum support system functionality directly affects the quality and the efficiency of the AOI process. A vacuum support system can be a vacuum-drum equipped with a plurality of vacuum-conduits. An example is the use of vacuum means to hold a printing-plate to the rotating vacuum-drum in the printing and the art-graphics industries. In fact, generally speaking, the vacuum support system contact surface that face the object, may be of any rational geometry. This contact surface may involve cavities or grooves that may connects one or more vacuum-conduits. It is commonly done in order to increase the effective area.

A vacuum support system is a common mean for holding, gripping or supporting objects (hereafter referred to as "object"), by using the pressure difference between the ambient pressure acting on one side of the object and a low pressure, usually lower than one Bar (hereafter referred to as "vacuum"), introduced to the object's opposing side. The self-adaptive vacuum support apparatus of the present invention is a system that employs the fluid-dynamic mechanism of aerodynamic blockage. The main objective of the present invention is to provide a practical solution to the problem of the parasite MFR, a common source to system failures. Significantly large parasite MFR is often found when a vacuum support system has a plurality of vacuum-conduits but significant number of them are not covered by the object to be held. When a vacuum support system is equipped with the novel vacuum-conduits based on the vortical aerodynamic blockage mechanism (hereafter referred to as SASO-conduit), parasite MFR is dramatically reduced yet the required vacuum force is maintained.

The SASO-conduit has a special internal geometry that dictates the aerodynamic blockage. Such blockage is evident only when the SASO-conduit is open and through flow exists. When the SASO-conduit is closed, the flow stops and the vacuum is uninterruptedly introduced to the object, thus a static state essentially exists. This self-adaptive behavior of the SASO-conduit with respect to the external environment, provides a vacuum support system of superior characteristics, relative to common vacuum support system based on conventional vacuum-conduits. The special SASO-conduit of the present invention is in fact an conduit of large physical scale but X effectively behaves as a small scale open conduit in a dynamic state, when through flow exists. The SASO-conduit's large physical scale is dominant in static state, when it is closed and the vacuum is introduced to the object. It's large physical scale also serves to reduce the risk of mechanical blockage that can also be a source for system failure. The small effective scale of the SASO-conduit at the dynamic state provides a dramatic reduction of parasite MFR. The control of the MFR through the SASO-conduit by applying aerodynamic blockage is an essential feature of the present invention. Another fundamental feature of great practical importance is the high internal pressure drop that develops inside the SASO-conduit. These features play an important role both with respect to the vacuum-force and to the attenuation of noise sources.

The aerodynamic blockage mechanism based on vortical fluid structures is created by the SASO-conduit special internal geometry. The special geometry of the SASO-conduit is two opposite arrays of separation-fins arranged asymmetrically. The SASO-conduit special internal flow-field pattern is two opposing arrays of vortices, developed inside the cavities between the fins, after the flow had been separated from the fin's tip. Practically the vortices occupy most of the SASO-conduit internal space, thus thin, essentially central, core-flow is developed. The vortical flow pattern may involve secondary unsteady flow of periodic or even chaotic nature. It is a fact that there is no MFR through stationary vortices thus a vortex can block the flow as much as the fin does. Nevertheless, vortices having unsteady secondary flow, are of almost closed stream lines, thus practically they may also serve as solid barriers. Furthermore, SASO-conduits is a "solid" flow-control device that have no moving parts, or any other means of control.

The fundamental substance of the present invention is a dynamic sort of an orifice that part of it is a solid component—the fin, and it's second complementary half is a dynamic, fluidic entity—the vortex of practically close stream lines. This artificial orifice is evident only when the SASO-conduit is open and there is flow through it. The SASO based vacuum support system of the present invention is equipped with one, few, or large numbers of cooperating SASO-conduits.

Figure 11:
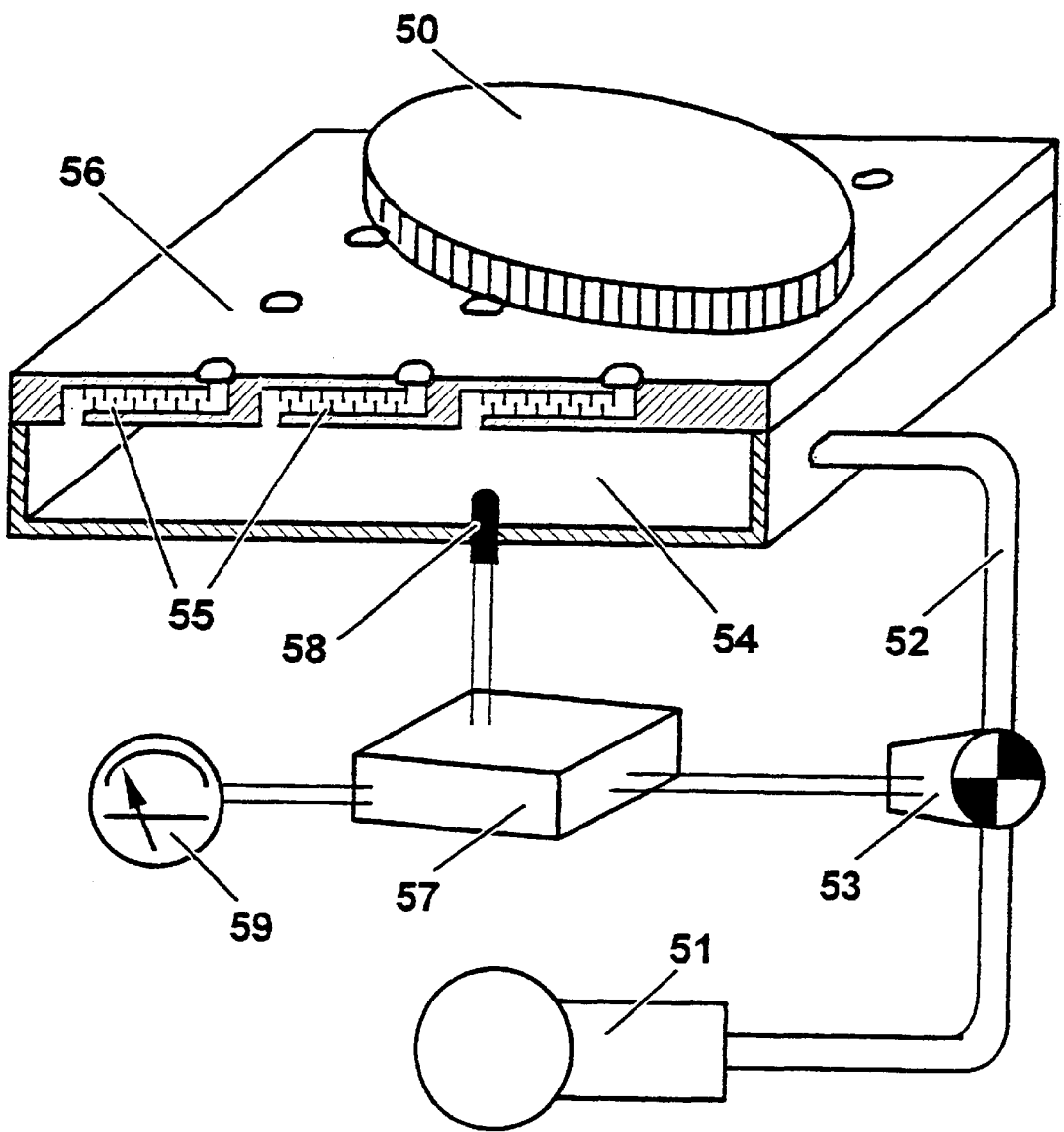
FIG. 11 illustrates a self adaptive vacuum support apparatus, in accordance with a preferred embodiment of the present invention.
Figure 14:
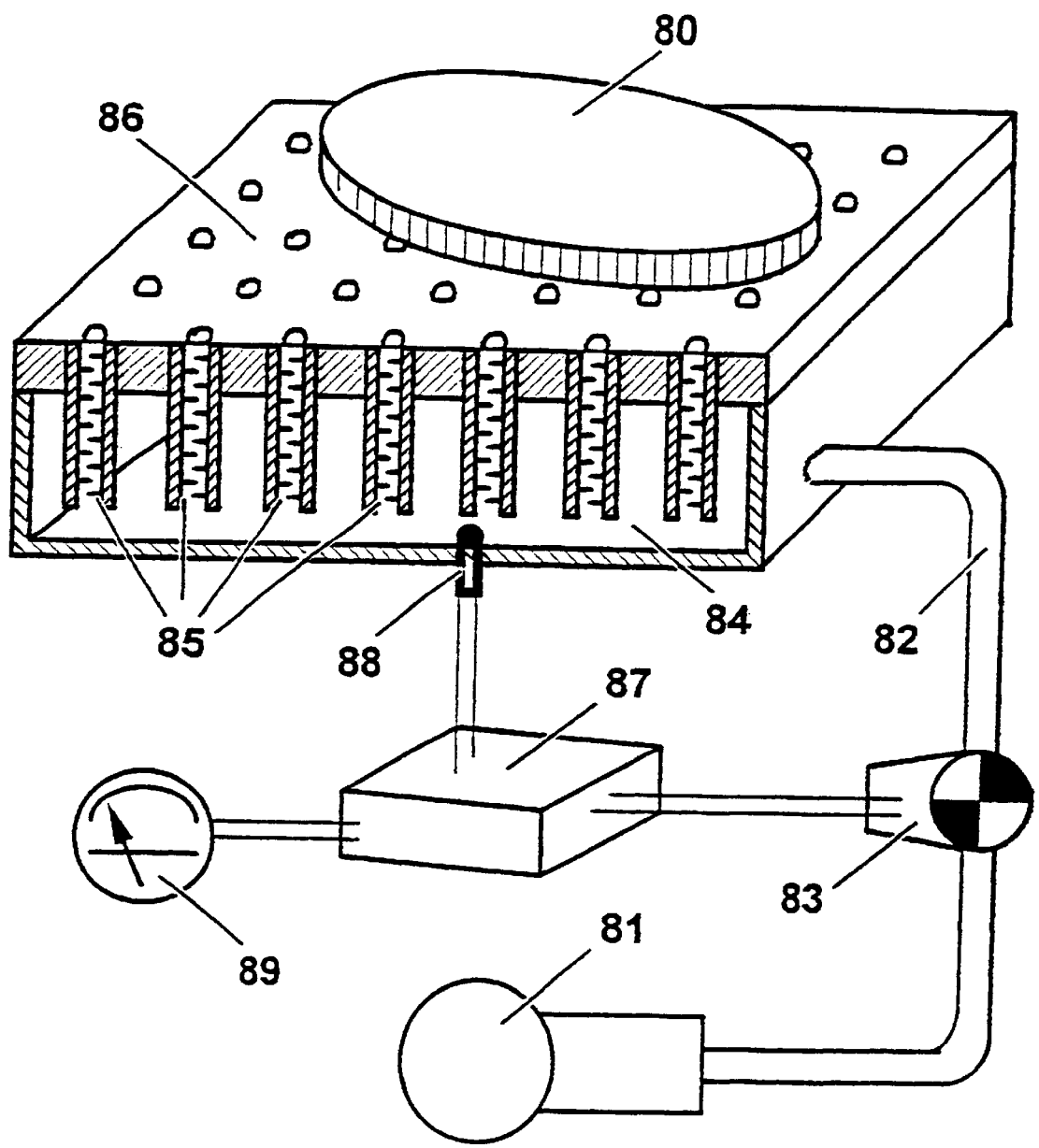
FIG. 14 illustrates a self adaptive vacuum support apparatus, in accordance with a preferred embodiment of the present invention, depicting a vacuum-frame.

The objective of the present invention is to significantly improve vacuum support system, based on the special self-adaptive SASO-conduit. A typical SASO based vacuum support system of the present invention, is the vacuum-frame shown in FIG.-11. Such a system, used to hold an object (50), comprises the following components. The vacuum-source (51) may be a vacuum-pump of any type, including Venturi type of vacuum-pump. Vacuum-pipelines (52), optionally equipped with a manual or an automatic control-valve (53), connect the vacuum-pump with the vacuum-reservoir (54), or vacuum-manifold. The vacuum-reservoir or vacuum-manifold is used when a plurality of vacuum-conduit are being used, otherwise, when one or a few SASO-conduit elements are used, one or few vacuum-pipes may directly be used to introduce the vacuum to the SASO-conduit inlets. One, few or a plurality of SASO-conduit elements (55) are in use, in respect with the different types of vacuum support systems. The SASO-conduit elements shown in FIG.-11, are mounted inside of the vacuum-frame embodiment in parallel to its surface to reduce the width of the vacuum reservoir wall, but it is also possible to mount the SASO-conduit elements normal to the frame surface (FIG.-14). In both examples the plurality of SASO-conduits directly introduce the vacuum to the object at the contact surface (56), a common practice in cases where large number of vacuum-conduits are used. The vacuum support systems may or may not be equipped with control means (57) or sensors (58), to serve the control task, possibly by actuating valve (53). Vacuum indicator (59) may also be used.

The vacuum-conduits (55) of the present invention, based on the aerodynamic blockage mechanism are in fact SASO-conduit elements. Such self-adaptive, dual-functioning elements establish a novel vacuum support system of new and improved characteristics. The present invention covers all variants, versions or types of vacuum support system where vacuum-conduits, based on the aerodynamic blockage mechanism, are involved. Without derogating the generality of the present invention, several common models of vacuum support system based on SASO-conduit elements will further be described.

The vacuum-force in accordance with the present invention may be measured in terms of Grams (few to several hundreds) for small scale applications. This force may also be measured in terms of Kilograms for large scale applications. The typical SASO-conduit diameter in respect with the present invention can be smaller than one millimeter. Alternatively, it may be measured in terms of millimeters or centimeters.

Figure 12:
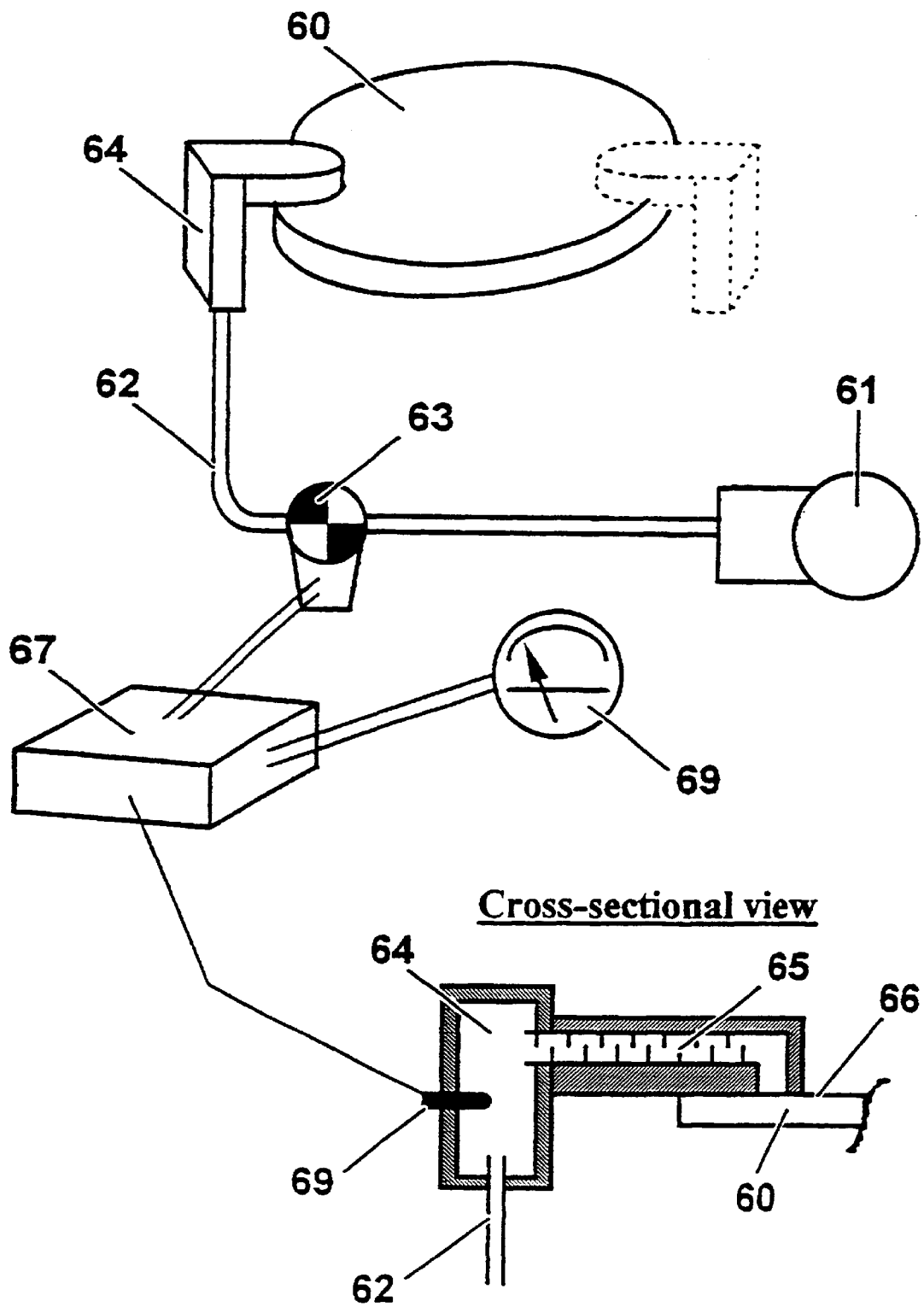
FIG. 12 illustrates a self adaptive vacuum support apparatus, in accordance with a preferred embodiment of the present invention, used as a robot arm.

The vacuum support system in accordance with the present invention can be adapted to act as a robot-arm, equipped with one or several SASO-conduit elements used as a vacuum pads. It can be used in the Semi-Conductors industry to hold a wafer edge (60), as shown in FIG.-12. Such a system comprises a vacuum-source (61), a vacuum-pipeline (62) with a possible control-valve (63) to connect the vacuum-pump with the vacuum-manifold (64). A single SASO-conduit element (65) can be installed inside the robot-arm embodiment, and it is also possible to equip the robot-arm with several SASO-conduit elements. Alternatively, a single SASO-conduit element may be mounted along the vacuum pipeline, thus serving all the vacuum-conduits. Another practice is a direct use of the SASO-conduit elements to connect the vacuum-manifold with the contact surface (66).

The vacuum is provided at the robot-arm contact surface. The resultant vacuum-force can be applied to hold the object in any spatial orientation with respect to gravity. In addition, a lateral friction force results from the normal vacuum force. Such a system may involve control means (67) and sensors (68) for the vacuum control task, possibly by a control valve (63). Vacuum indicator (69) may also be used. A common way to increase the vacuum-force is to enlarge the system effective area. It may be done, for example, by expanding the SASO-conduit exits or by creating thin grooves on the contact surface, grooves that may connect one or more vacuum-conduits. It is possible to combine two or more types of SASO-conduit elements to provide a better functioning vacuum support system.

Figure 13:
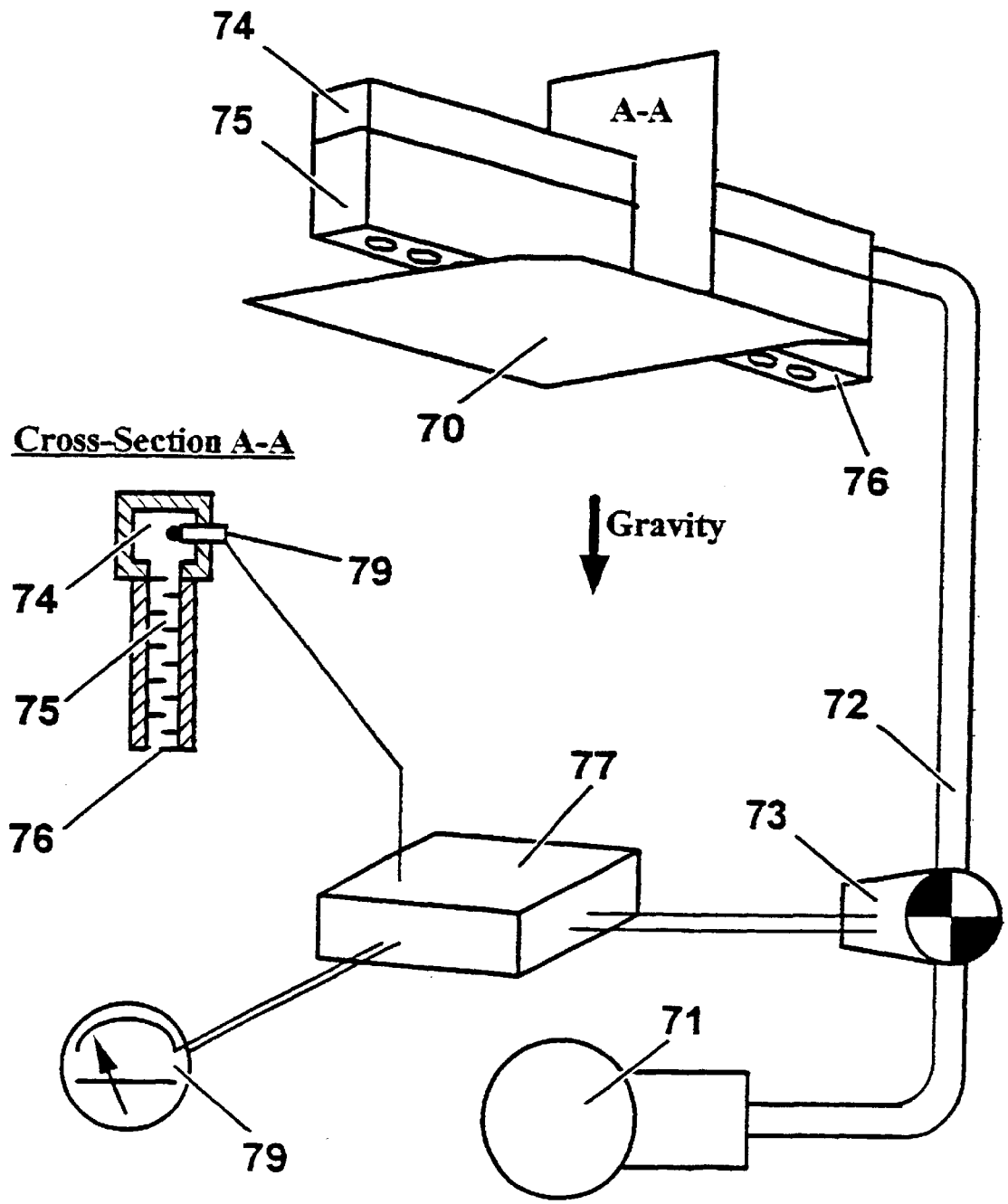
FIG. 13 illustrates a self adaptive vacuum support apparatus, in accordance with a preferred embodiment of the present invention, used as a vacuum-feeder.

The vacuum support system in accordance with the present invention may be a vacuum-feeder, where a row of several SASO-conduit is used. A typical application for such a system is a printer's paper-feeder where the vacuum-feeder system is used to hold up the paper edge (70), as shown in FIG.-13. The vacuum-feeder system includes vacuum- source (71), vacuum-pipeline (72) possibly with a control valve (73) and an elongated vacuum-manifold (74). The vacuum-feeder includes a plurality of SASO-conduit elements (75), arranged along the vacuum-feeder embodiment, to route the vacuum from the manifold to the contact surface (76), as shown in FIG.-13. Alternatively, R is possible to mount a single SASO-conduit element along the vacuum pipeline to control the flow through all the conduits. The vacuum-feeder system may involve control means (77) and sensors (78) to serve the control task. A vacuum indicator (79) may also be used. A common way to increase the vacuum-force is to enlarge the system effective area. It may be done, for example, by expanding the SASO-conduit exits or by creating thin grooves on the contact surface, grooves that may connect one or more vacuum-conduits It is possible to combine two or more types of SASO-conduit elements to provide a better functioning vacuum support system.

The vacuum support system in accordance with the present invention can be a vacuum-frame, a flat surface equipped with a plurality (tenth, hundreds and more) of SASO-conduit. A typical applications for such a system is a rectangular vacuum-frame that holds a PCB of smaller dimensions (relative to the frame dimensions), in the AOI industry. It may also be an annular or rectangular chuck that holds a wafer (80) during the SC fabrication process, as shown in FIG.-14. The vacuum-frame system includes a vacuum-source (81), a vacuum-pipeline (82), with a possible control-valve (83), and a vacuum-reservoir (84). The vacuum-reservoir attaches to the rear side of the vacuum-frame, may be one cavity or alternatively, it may be split to several sectors (separated cavities), thus the vacuum is introduced to each sector individually. Yet, each of the sectors also contain a plurality of SASO-conduits. The SASO-conduit elements (85) can be oriented normal to (see FIG.-14) or in parallel (see FIG.-11) to the vacuum-frame contact surface (86), that attaches the object (80). It is possible to combine two or more variants of SASO-conduit elements to provide a better functioning vacuum-frame system, to fulfill specific engineering requirements. The vacuum-frame system may or may not be equipped with control means (87) and sensors (88) to serve the control task. Vacuum indicator (89) may also be included.

A common way to increase the vacuum-frame supporting force is to increase the effective area. It can be done by a geometric expansion of the SASO-conduit exits, or a plurality of small grooves at the vacuum-frame contact surface. Such grooves possibly connect two or more SASO-conduit elements.

Figure 15:
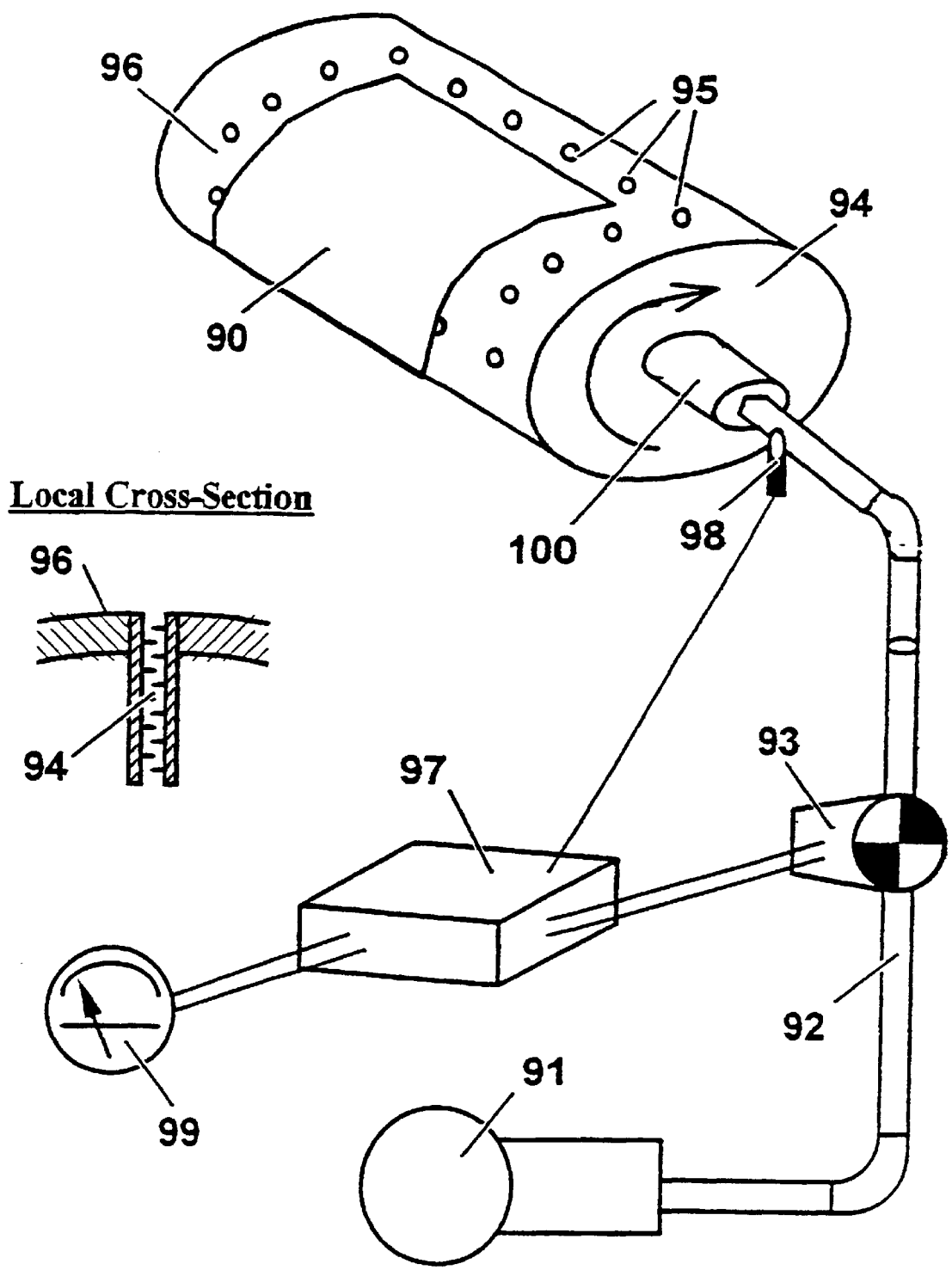
FIG. 15 illustrates a self adaptive vacuum support apparatus, in accordance with a preferred embodiment of the present invention, in the form of a vacuum-drum.

The vacuum support system in accordance with the present invention can be a vacuum-drum, having an annular surface equipped with a plurality (tenth, hundreds and more) of SASO-conduit elements. Such a system is widely used in the printing and in the art-graphic industries, to hold, for example, an aluminum printing-plate (90) as shown in FIG.-15. The vacuum-drum system includes a vacuum-source (91), a vacuum pipeline (92) with a possible control valve (93), and a rotating vacuum reservoir (94). The vacuum reservoir may expand to the entire internal space of the drum, or alternatively, it may be of a reduced volume, attached to the drum embodiment. For such a reservoir, a special rotating vacuum-joint (100) must be used. The use of individually controlled sectors (several separated reservoirs) can be adopted also for the vacuum-drum system. A plurality of SASO-conduit elements (95) is used to introduce the vacuum at the vacuum-drum contact surface (96). The vacuum-drum system may be equipped with control means (97) and sensors (98) to serve the control task. Vacuum indicator (99) may also be involved.

It is possible to combine two or more variants of SASO-conduit elements to provide a better functioning vacuum-drum system, according to specific engineering requirements. A common way to increase the vacuum force is to increase the effective area. For example, it can be an expansion of the SASO-conduit exit, or small grooves at the drum contact surface. Such grooves possibly connects two or more SASO-conduit elements.

The above mentioned representative models of vacuum support system, in accordance with the present invention, are in common use. It has to be emphasized that any other apparatus that makes use of the SASO-conduit type of conduits and its beneficial features, the essential idea of the present invention, is also included in the scope of the present invention, the SASO-conduit based vacuum support system.

It should be clear that the description of the embodiments and attached FIGURES set forth in this specification serves only for a better understanding of the invention, without limiting its scope as covered by the following Claims.

It should also be dear that a person in the art, after reading the present specification could make adjustments or amendments to the attached FIGURES and above described embodiments that would still be covered by the following Claims.

What is claimed is:

1. A self-adaptive vacuum grip apparatus comprising:
   a vacuum source;
   a vacuum reservoir fluidically connected to said vacuum source;
   a contact surface;
   a plurality of conduits;
   wherein said conduit has an inlet positioned on said contact surface and an outlet fluidically connected to said vacuum reservoir said conduit is provided with a plurality of fins mounted on the internal wall of said conduit said fins arranged in two arrays substantially opposite each other;
   wherein each of the fins of either one of said fin arrays excluding the fin nearest to the inlet and the fin nearest to the outlet of said conduit is positioned substantially opposite to one of a plurality of cavities each cavity defined between two consecutive fins of one of said arrays of fins and a portion of said conduit internal walls;
   whereby when fluid flows through said conduit a plurality of vortices is facilitated within said cavities and wherein the vortices may exist at least temporarily during said flow thus forming an aerodynamic blockage allowing a central core-flow between tips of said fins, thus limiting the mass flow rate and maintaining a substantial pressure drop within the conduit;
   whereby when an object covers the inlet of said conduit the flow stops, and the pressure drop is eliminated thus said object is effectively held by the vacuum to said contact surface whereas when the inlet is not covered an aerodynamical blocking is achieved and the flow rate through the conduit is substantially reduced thus substantially reducing the need for powerful vacuum source and reducing the risk of loosing vacuum grip of the apparatus when a portion of the conduits are not covered.

2. The apparatus as claimed in claim 1, wherein said fluid is air.

3. The apparatus as claimed in claim 1, wherein said fins are L-shaped.

4. The apparatus as claimed in claim 1, wherein said fins are U-shaped.

5. The apparatus as claimed in claim 1, wherein said conduit follows a straight path.

6. The apparatus as claimed in claim 1, wherein said conduit follows a tortuous path.

7. The apparatus as claimed in claim 1, wherein said conduit cross-section is substantially rectangular.

8. The apparatus as claimed in claim 1, wherein said conduit cross-section is substantially polygonal.

9. The apparatus as claimed in claim 1, wherein said conduit cross-section is substantially circular.

10. The apparatus as claimed in claim 1, wherein the downstream distribution of said conduit cross-section area is uniform.

11. The apparatus as claimed in claim 1, wherein the downstream distribution of said conduit cross-section area is divergent.

12. The apparatus as claimed in claim 1, wherein the downstream distribution of said conduit cross-section area is convergent.

13. The apparatus as claimed in claim 1, wherein said fins are substantially perpendicular to said internal wall of the conduit.

14. The apparatus as claimed in claim 1, wherein said fins are inclined with respect both to the general core-flow direction of motion and to the conduit internal walls.

15. The apparatus as claimed in claim 1, wherein the fin typical thickness is of smaller order of magnitude than the distance between two consecutive fins of same said fin array.

16. The apparatus as claimed in claim 1, wherein the fin cross-section is substantially rectangular.

17. The apparatus as claimed in claim 1, wherein the fin cross-section is substantially trapezoidal.

18. The apparatus as claimed in claim 1, wherein the fin cross-section is substantially concave at least on one side.

19. The apparatus as claimed in claim 1, wherein the distance between two consecutive fins is constant along the conduit.

20. The apparatus as claimed in claim 1, wherein the distance between an two consecutive fins varies along the conduit.

21. The apparatus as claimed in claim 1, wherein the span of each of said fins is uniform along the conduit.

22. The apparatus as claimed in claim 1, wherein the span of said fins varies along the conduit.

23. The apparatus as claimed in claim 1, wherein the span of said fin is laterally uniform.

24. The apparatus as claimed in claim 1, wherein the span of said fin laterally varies.

25. The apparatus as claimed in claim 1, wherein the tips of said fins are sharp.

26. The apparatus as claimed in claim 1, wherein the tips of said fins are blunt.

27. The apparatus as claimed in claim 1, wherein the tips of said fins are curved.

28. The apparatus as claimed in claim 1, wherein each of said fins blocks substantially half of the conduit lateral width.

29. The apparatus as claimed in claim 1, wherein the two opposite fin arrays do not overlap.

30. The apparatus as claimed in claim 1, wherein the two opposite fin arrays overlap.

31. The apparatus as claimed in claim 1, wherein the ratio between the fin span and the gap between that fin and a consecutive fin of the same array of fins is in the range of 1:1 to 1:2.

32. The apparatus as claimed in claim 31, wherein the ratio is about 1:1.5.

33. The apparatus as claimed in claim 1, wherein the absolute value of the gap between the virtual plane connecting the fin tips of one of said two opposite fin arrays and the virtual plane connecting the fin tips of the second of said two opposite fin arrays is smaller in order of magnitude than the lateral width of said conduit.

34. The apparatus as claimed in claim 33, wherein said absolute value of said gap is not more than 20% of the adjacent lateral width of said conduit.

35. The apparatus as claimed in claim 1, wherein the said conduit passive dimension defined as the dimension perpendicular to the flow and to the span of the fins is in the order of magnitude the span of the fins.

36. The apparatus as claimed in claim 35, wherein said passive dimension is substantially larger than the lateral dimension of the conduit.

37. The apparatus as claimed in claim 35, wherein said passive dimension follows a close substantially annular route.

38. The apparatus as claimed in claim 1, wherein said vacuum reservoir is a vacuum-manifold.

39. The apparatus as claimed in claim 1, wherein conduits are substantially parallel to said contact surface.

40. The apparatus as claimed in claim 1, wherein said conduits are conduits mount normally to said contact surface.

41. The apparatus as claimed in claim 1, where said contact surface is a flat vacuum frame.

42. The apparatus as claimed in claim 41, wherein said vacuum frame is rectangular.

43. The apparatus as claimed in claim 41, wherein said vacuum frame is circular.

44. The apparatus as claimed in claim 1, wherein said contact surface is cylindrical drum-like contact surface.

45. The apparatus as claimed in claim 1, wherein said contact surface includes grooves.

46. The apparatus as claimed in claim 1, wherein the contact surface is movable a long a predetermined path.

47. A self-adaptive vacuum grip apparatus comprising:

a vacuum source;

a vacuum reservoir fluidically connected to said vacuum source;

a contact surface;

at least one conduit of a plurality of conduits;

wherein said conduit has an inlet positioned on said contact surface and an outlet fluidically connected to said vacuum reservoir said conduit is provided with a helical fin mounted on the internal wall of said conduit thus a helical cavity is formed defined by said helical fin and said internal wall;

wherein when a fluid flows through said conduit a helical vortex is facilitated within said cavity and wherein the helical vortex may exist at least temporarily during said flow thus forming an aerodynamic blockage allowing a central core-flow between the tip of said fin, thus limiting the mass flow rate and maintaining a substantial pressure drop within the conduit;

whereby when an object covers the inlet of said conduit the flow stops, and the pressure drop is eliminated thus said object is effectively held by the vacuum to said contact surface whereas when the inlet is not covered an aerodynamical blocking is achieved and the flow rate through the conduit is substantially reduced; thus substantially reducing the need for powerful vacuum source and reducing the risk of loosing vacuum grip of the apparatus when a portion of the conduits are not covered.

* * * * *